United States Patent
Losert et al.

(10) Patent No.: US 12,472,286 B2
(45) Date of Patent: Nov. 18, 2025

(54) COMPOSITIONS COMPRISING TEXTURED PATTERNS AND METHODS OF USING THE SAME

(71) Applicant: University of Maryland, College Park, College Park, MD (US)

(72) Inventors: Wolfgang Losert, Bethesda, MD (US); John T. Fourkas, Bethesda, MD (US); Meghan Driscoll, Berwyn Heights, MD (US); Floyd Bates, II, Upper Marlboro, MD (US); Xiaoyu Sun, Laurel, MD (US); Can Guven, Hilsboro, OR (US); Joshua Parker, Washington, DC (US)

(73) Assignee: University of Maryland, College Park, MD (US)

( * ) Notice: Subject to any disclaimer, the term of this patent is extended or adjusted under 35 U.S.C. 154(b) by 243 days.

(21) Appl. No.: 18/059,288

(22) Filed: Nov. 28, 2022

(65) Prior Publication Data

US 2023/0181799 A1    Jun. 15, 2023

Related U.S. Application Data

(62) Division of application No. 15/420,016, filed on Jan. 30, 2017, now abandoned.

(60) Provisional application No. 62/288,134, filed on Jan. 28, 2016.

(51) Int. Cl.
*A61L 27/50* (2006.01)
*A61F 13/02* (2006.01)

(52) U.S. Cl.
CPC .......... *A61L 27/50* (2013.01); *A61F 13/0243* (2013.01)

(58) Field of Classification Search
CPC .............................. A61L 27/50; A61F 13/0243
See application file for complete search history.

(56) References Cited

U.S. PATENT DOCUMENTS

| | | |
|---|---|---|
| RE24,906 E | 12/1960 | Ulrich |
| 3,389,827 A | 6/1968 | Abere et al. |
| 4,112,177 A | 9/1978 | Salditt et al. |
| 4,112,213 A | 9/1978 | Waldman |
| 4,310,509 A | 1/1982 | Berglund et al. |
| 4,323,557 A | 4/1982 | Rosso et al. |
| 4,737,410 A | 4/1988 | Kantner |
| 5,419,913 A | 5/1995 | Podell et al. |
| 5,648,166 A | 7/1997 | Dunshee |
| 6,174,399 B1 | 1/2001 | DeCandia et al. |
| 6,441,092 B1 | 8/2002 | Gieselman |
| 6,497,949 B1 | 12/2002 | Hyde et al. |
| 2007/0010777 A1 | 1/2007 | Dunshee et al. |
| 2009/0076430 A1* | 3/2009 | Simpson ............... A61L 15/425 602/42 |
| 2011/0021965 A1 | 1/2011 | Karp et al. |
| 2014/0148389 A1 | 5/2014 | Braiman-Wiksman et al. |
| 2015/0004692 A1 | 1/2015 | Le Berre et al. |
| 2016/0158414 A1 | 6/2016 | Matheny |
| 2017/0216543 A1* | 8/2017 | Magin ................... A61M 25/00 |

FOREIGN PATENT DOCUMENTS

WO    WO-2013091790 A1 *  6/2013  ....... A61F 13/00021

OTHER PUBLICATIONS

"Definition of Asymmetry," <https://www.mathsisfun.com/definitions/asymmetry.html#:~:text=Asymmetry%20means%20%22no%20symmetry%22.,way%20and%20asymmetrical%20in%20another>, 2018, pp. 1.
Sun et al., "Asymmetric Nanotopography Biases Cytoskeletal Dynamics and Promotes Unidirectional Cell Guidance," PNAS, Oct. 13, 2015, p. 12557-12562, vol. 112, No. 41.
Chen et al., "Actin Cytoskeleton and Focal Adhesions Regulate the Biased Migration of Breast Cancer Cells on Nanoscale Asymmetric Sawteeth," ACS Nano, 2019, pp. 1454-1468, 13.
Wang et al., "Epitaxially Grown Collagen Fibrils Reveal Diversity in Contact Guidance Behavior among Cancer Cells," Langmuir, 2015, pp. 307-314, 31(1).
Xiao et al., "Dynamic Distribution of Chemoattractant Receptors in Living Cells During Chemotaxis and Persistent Stimulation," J Cell Biol, 1997, pp. 365-374, 139(2).
McCann et al., "Cell Speed, Persistence and Information Transmission During Signal Relay and Collective Migration," J Cell Sci, 2010, pp. 1724-1731, 123 (Pt10).
Clarke et al., "Curvature Recognition and Force Generation in Phagocytosis," BMC Biol, 2010, pp. 154, 8.
Katoh et al., "Developmental Commitment in Dictyostelium Discoideum," Eukaryot Cell, 2007, pp. 2038-2045, 6(11).
Houk et al., "Membrane Tension Maintains Cell Polarity by Confining Signals to the Leading Edge during Neutrophil Migration," Cell, 2012, pp. 175-188, 148(1-2).
Risca et al.,"Actin Filament Curvature Biases Branching Direction," PNAS, 2012, pp. 2913-2918, 109(8).

(Continued)

*Primary Examiner* — Micah Paul Young
(74) *Attorney, Agent, or Firm* — Quarles & Brady LLP

(57) ABSTRACT

The invention provides method of guiding unidirectional movement of a cell comprising exposing the cell to a surface comprising an asymmetric, three-dimensional pattern of one or a plurality of topographical elements for a time period sufficient to bias actin polymerization within the cell. The invention also provides methods of inducing directional movement of a cell, and methods of harnessing an actin wave within a cell. In addition, the invention provides compositions comprising a contact side, wherein at least a portion of the contact side comprises a cell contact portion comprising an asymmetric, three-dimensional pattern of one or a plurality of topographical elements, and methods of inducing healing of a wound of a subject comprising contacting the wound with the composition.

19 Claims, 20 Drawing Sheets

(56) References Cited

OTHER PUBLICATIONS

Conklin et al., "Aligned Collagen Is a Prognostic Signature for Survival in Human Breast Carcinoma," Am J Pathol, 2011, pp. 1221-1232, 178(3).
Kriebel et al., "Adenylyl Cyclase Localization Regulates Streaming during Chemotaxis," Cell, 2003, pp. 549-560, 112 (4).
Driscoll et al., "Cellular Contact Guidance through Dynamic Sensing of Nanotopography," ACS Nano, 2014, pp. 3546-3555, 8(4).
Collins et al., "ImageJ for Microscopy," Biotechnique, 2007, pp. 25-30, 43(1 Suppl).

* cited by examiner

Preferred direction of cell migration

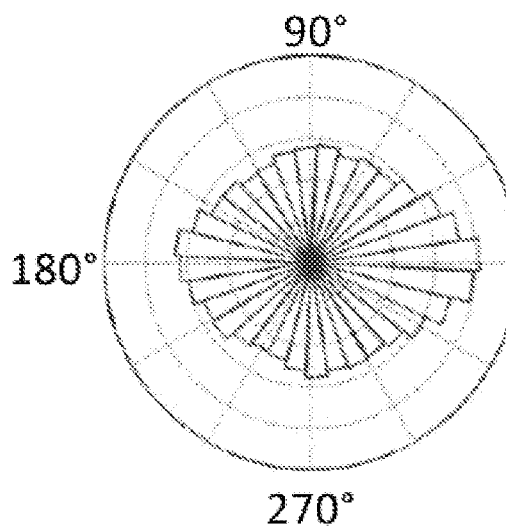
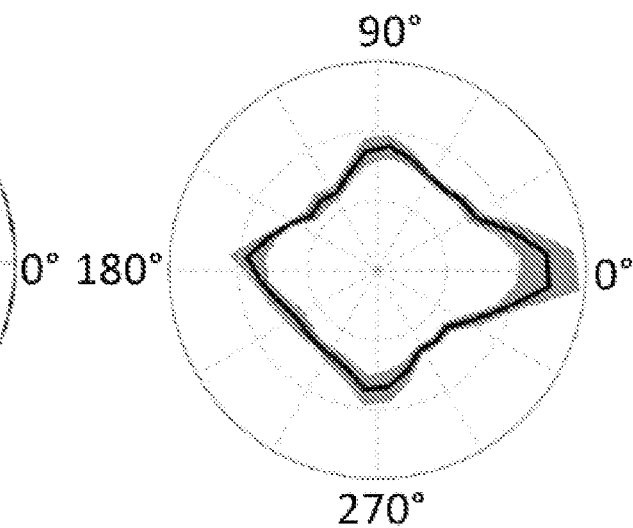
FIG. 2A                FIG. 2B
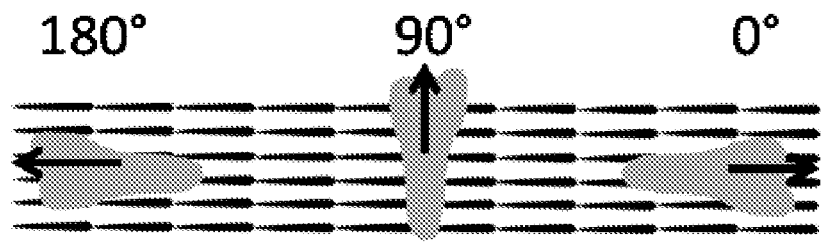
FIG. 2C

8-μm sawteeth

Angle (with respect to the sawteeth)

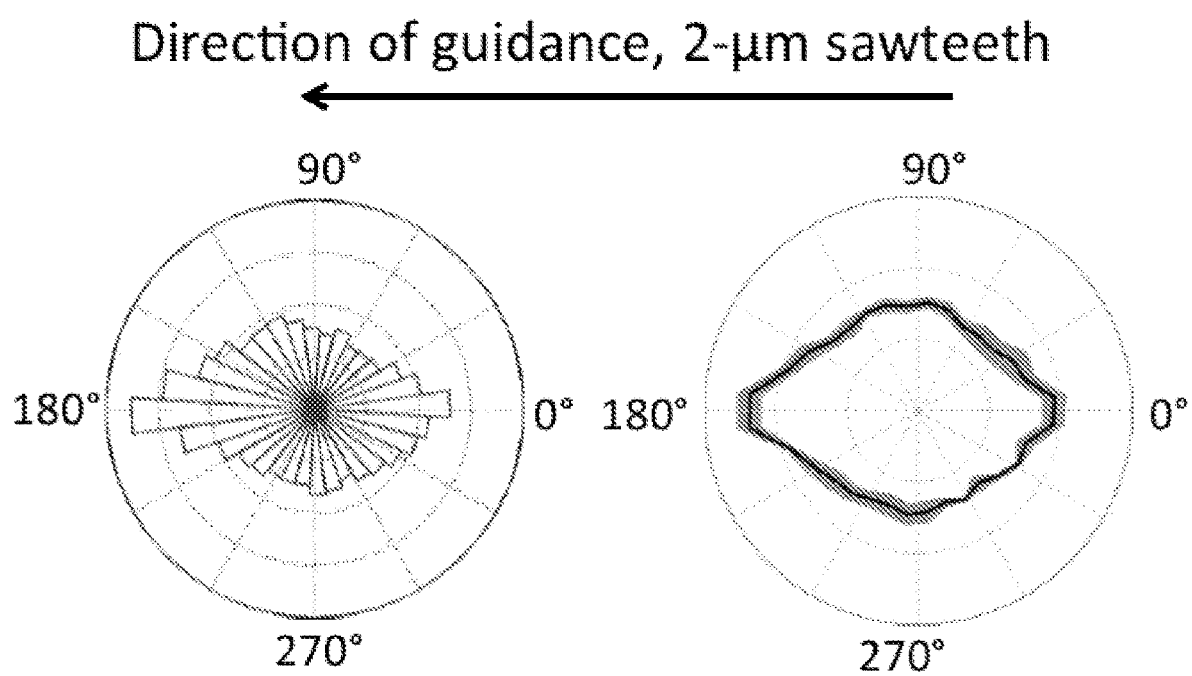
FIG. 2F    FIG. 2G
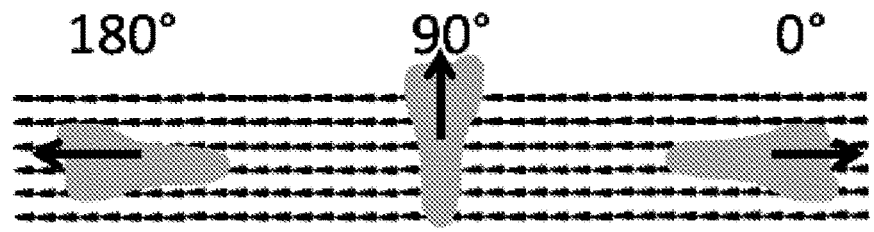
FIG. 2H

2-μm sawteeth

Angle (with respect to the sawteeth)

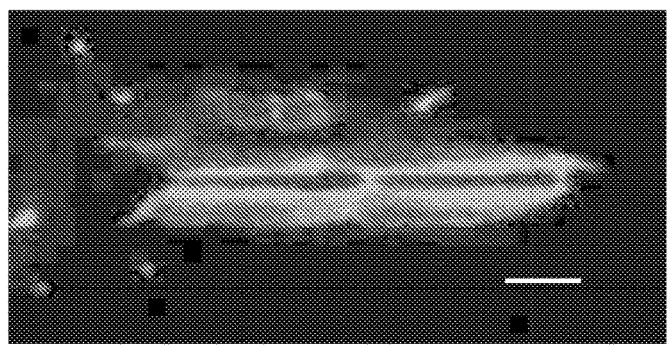
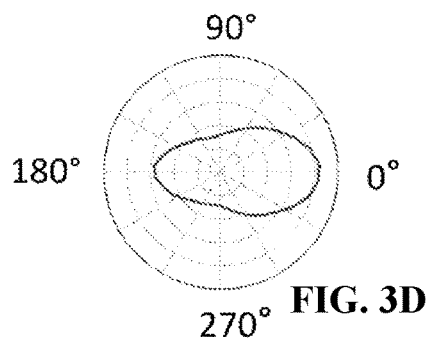
FIG. 3A
FIG. 3D
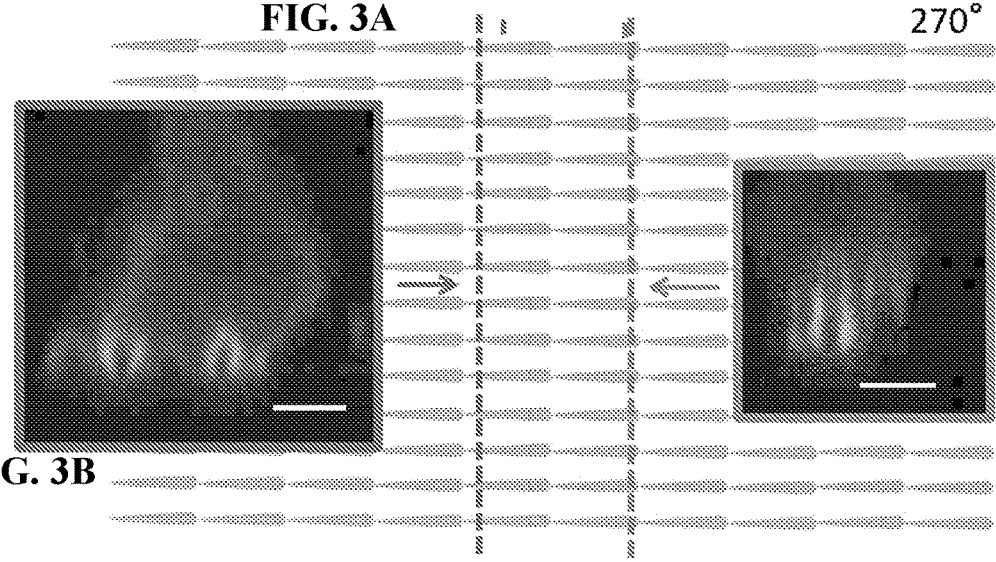
FIG. 3B
FIG. 3C
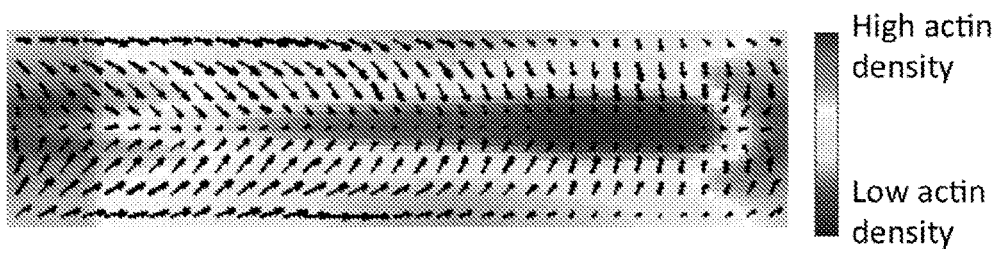
FIG. 3E

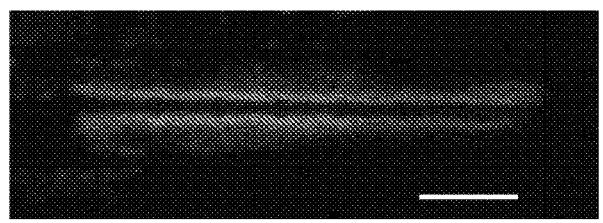
FIG. 3G
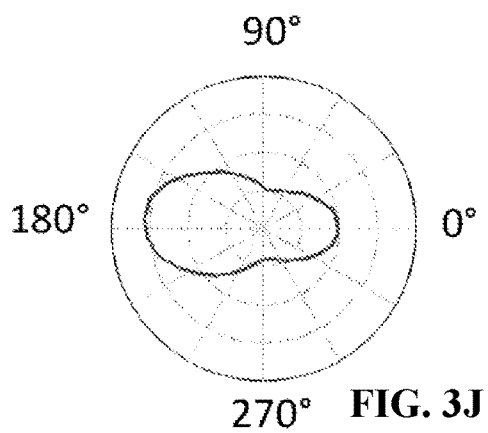
FIG. 3J
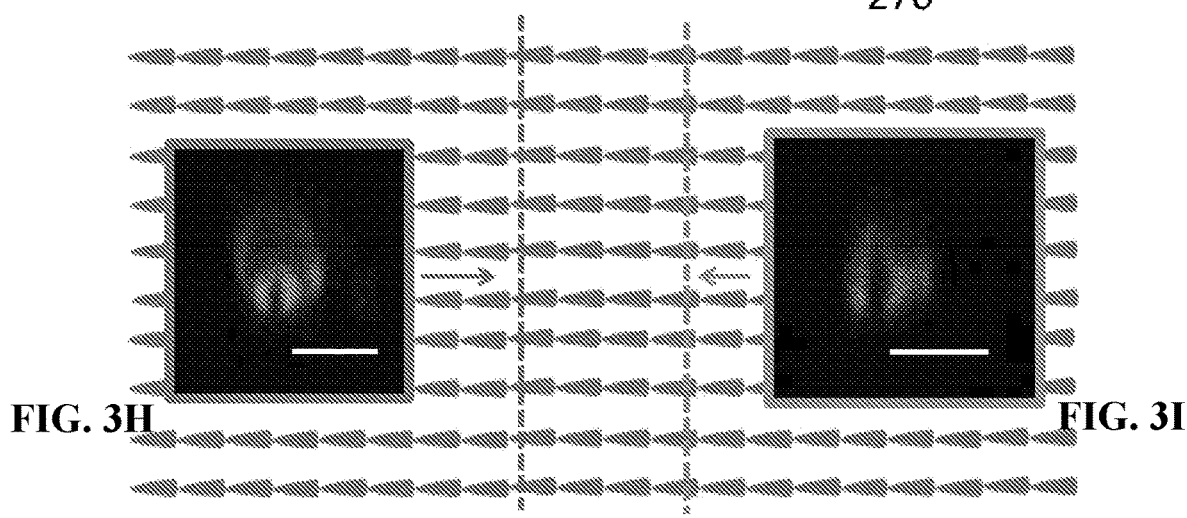
FIG. 3H     FIG. 3I
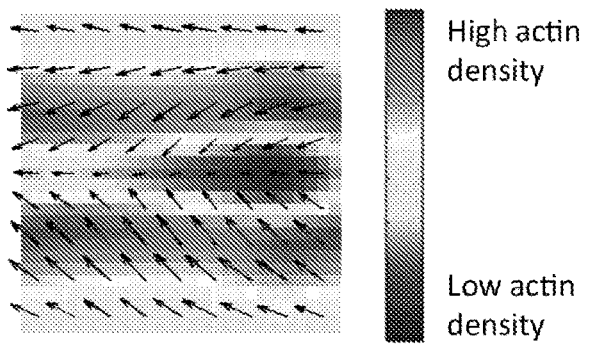
FIG. 3K

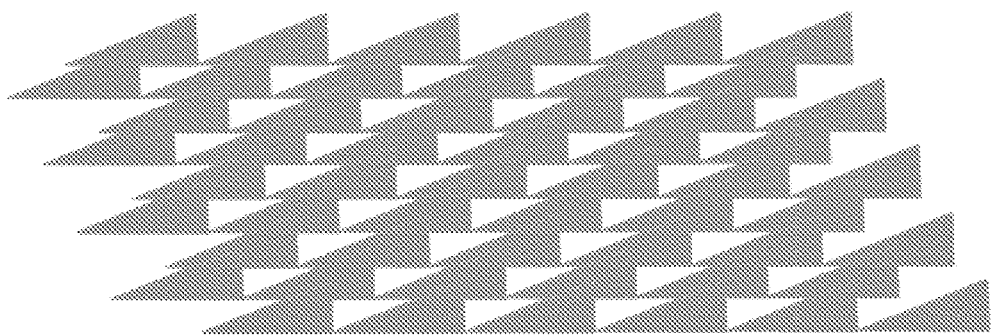
FIG. 5A
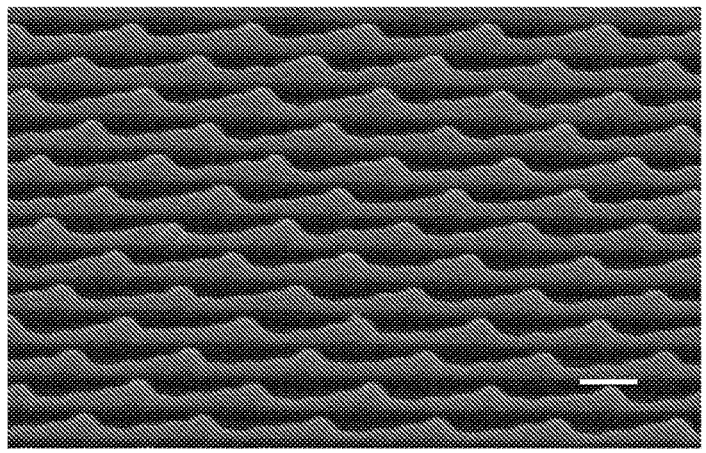
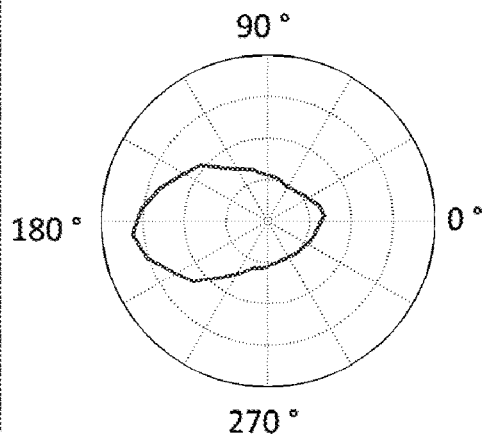
FIG. 5B              FIG. 5C

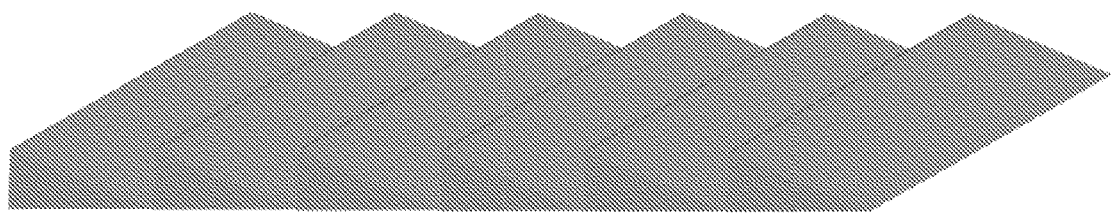
FIG. 6A
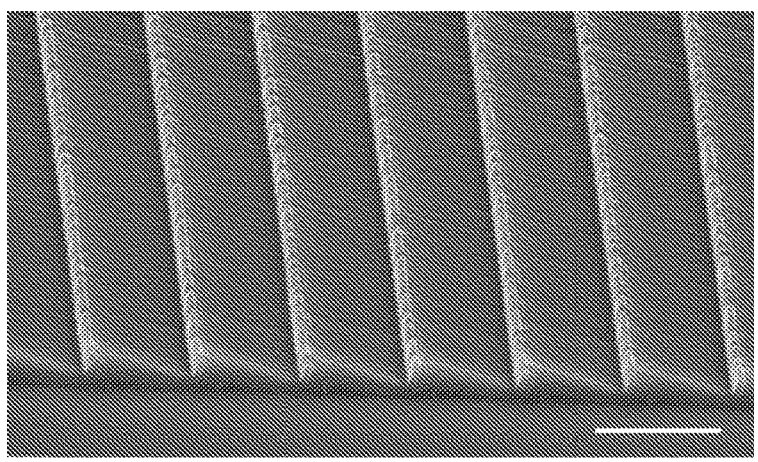
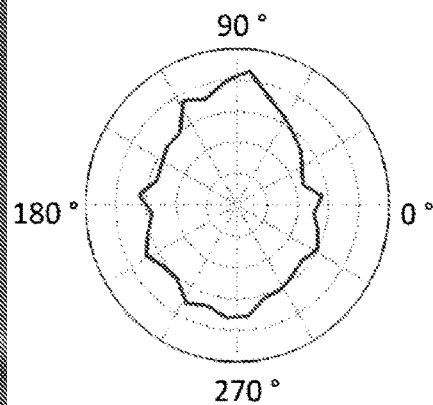
FIG. 6B  FIG. 6C

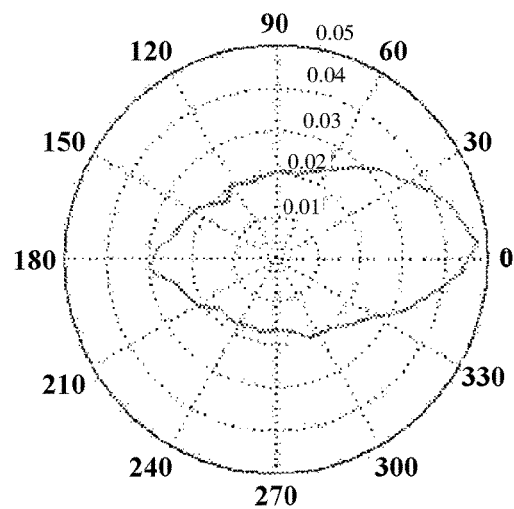 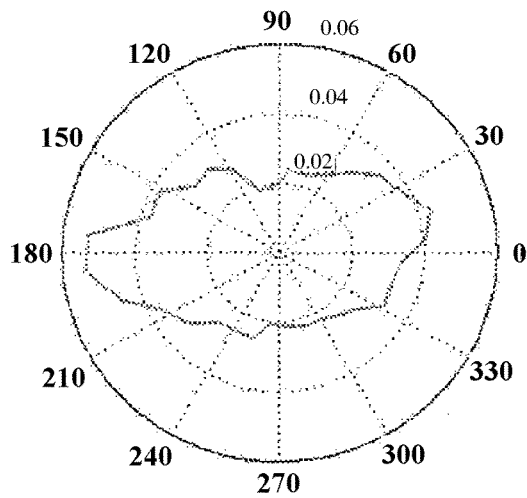
FIG. 10A  FIG. 10B
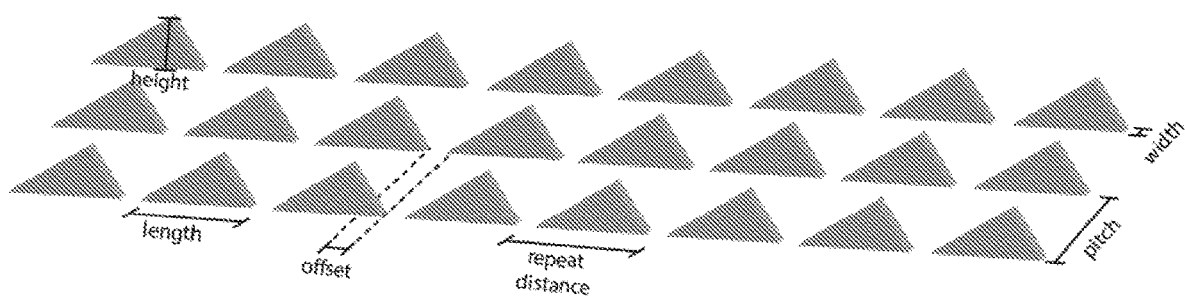
FIG. 11

COMPOSITIONS COMPRISING TEXTURED PATTERNS AND METHODS OF USING THE SAME

RELATED APPLICATIONS

This application claims priority to U.S. Provisional Patent Application Ser. No. 62/288,134 filed on Jan. 28, 2016, the contents of which are incorporated herein by reference in their entirety.

STATEMENT REGARDING FEDERALLY SPONSORED RESEARCH

This invention was made with government support under R01GM085574 awarded by the National Institutes of Health (NIH). The government has certain rights in the invention.

FIELD OF THE DISCLOSURE

The disclosure relates generally to compositions comprising textured patterns and methods of using the same for induction of unidirectional movement of one or a plurality of cells The disclosure also relates to method of making and using the textured nanoscale surface for wound healing when configured for application or presentation on a wound dressing, such as a bandage.

BACKGROUND

Cell migration is essential in many critical physiological processes (Ridley et al., 2003, Science 302: 1704) such as embryonic development (Doitsidou et al., 2002, Cell 111: 647) wound healing (Farooqui et al., 2005, J Cell Sci 118: 51), immune response, and angiogenesis (Seo et al., 2009, Journal of Orthopaedic Research 27: 495). Guidance of cells in a preferred direction has been well studied in the context of chemotaxis (McCann et al., 2010, J Cell Sci 123: 1724) in which cells migrate in response to an external gradient of chemoattractant. Recent studies have shown that cells can also sense and follow environmental gradient in other properties, such as substrate rigidity (durotaxis) (Lo et al., 2000, Biophysical Journal 79; 144) and cellular adhesion sites (haptotaxis) (Cattaruzza et al., 2005, Matrix Biology 24: 400).

Gradient-based cell guidance approaches share a crucial limitation: To maintain an uphill gradient in a physical or chemical property of the environment, the absolute value of the physical property or chemical concentration must continuously change with position. Though cells have the amazing ability to sense a 2% relative concentration gradient, the required concentration to maintain such gradients increases exponentially. Combined with a limited dynamic sensing range, this limits the practical range of e.g. chemotaxis to mm length-scales. Furthermore, chemical gradients naturally decay via diffusion and need to be maintained or locked in space.

It is well documented that many cells respond not only to chemical gradients, but also to topographical surface features by changing their proliferation, adhesion, migration and/or cell orientation [*Exp Cell Res* 2002, 276(1):1-9]. This interesting phenomenon is referred to as 'contact guidance'. Here we demonstrate that it is possible to adapt contact guidance, the ability of cells to follow surface topography, to generate unidirectional guidance comparable to chemotaxis. The key novelty of our approach is to fabricate underlying anisotropic topography at the nanoscale, much smaller than the size of a single cell, and guide dynamic processes within the cells orienting them for directional migration.

The generation of micro- and nano-topography similar to those found in the extracellular matrix of three-dimensional tissues is one technique not only used to recapitulate the cell-tissue physiology found in the native tissues, but also guide cells for directional migration (Langer et al., 2009, Angew Chem Int Edit 48: 5406). Biocompatible substrates with engineered micro- and/or nano-scale ridges or grooves that mimic ECM topography have been demonstrated to guide cell migration bidirectionally along the ridges or grooves via membrane-substrate contact guidance (Mahmud et al., 2009, Nat Phys 5: 606). However, inducing unidirectional cell migration using contact guidance remains challenging. Mahmud et al. have demonstrated that cell motion can be changed from random to unidirectional by imposing an asymmetric funnel-shaped geometry. Similarly, Berre et al. have topped cells with a non-adhesive surface of dense arrays of tilted micropillars in confined space, and found that cells migrate more persistently with a larger speed in the direction of tilt (Berre et al., 2013, Physical Review Letters 111: 198101). Both studies are based on a bias in the physical blocking of migration in one direction, inspired by a ratchet mechanism, which then biases the overall motion in a confinedgeometry.

In contrast to these studies, in our approach to unidirectional contact guidance cells are free to move on nanotopographic surfaces, and the nanoscale surface topography does not block motion, but instead initiates intracellular cytoskeletal processes that drive migration in one preferred direction. Cell migration is driven by the dynamic actin polymerization at the leading edge, which produces a branched actin network inside the plasma membrane that exerts physical force on the membrane to propel the cell forward (Gerisch et al., 2004, Biophysical journal 87: 3493). Our previous studies have shown that bidirectional contact guidance on ridges or grooves involves the preferential actin assembly parallel to these features. The aligned growth of actin filaments along micro- (Wojcak-Stothard et al., 1995, Cell Biology International 19: 485) or nano-gratings (Yim et al., 2005, Biomaterials 26: 5405) has been found in different cell types. Recent reports of the self-organized traveling actin waves in *D. discoideum* and neutrophils (Weiner et al., 2007, PloS Biol 5, e221) provide insights into the influence of substrate topography on the propagation of actin polymerization. Bretschneider et al. showed that actin and its associated proteins are recruited from the cytoplasm to form distinct three-dimensional patterns in actin waves, indicating that the propagation of actin waves is based on the activation and inactivation of actin polymerization in a defined temporal and spatial pattern (Bretschneider et al., 2009, Biophysical journal 96: 2888. As the actin waves couple to a substrate composed of three-dimensional asymmetric nanotopography with a temporal periodicity, it is possible that the asymmetric topography reorganizes and biases the actin waves, leading to unidirectional cell migration.

SUMMARY OF THE INVENTION

In certain aspects, the invention relates to method of guiding unidirectional movement of a cell comprising exposing the cell to a surface comprising a three-dimensional pattern of one or a plurality of asymmetric topographical elements for a time period sufficient to bias actin polymerization within the cell, wherein the topographical elements are from about 0.001 to about 100 microns in height or width or depth and aligned along at least one or a plurality of straight, curved or circumferential paths on the surface. In certain embodiments, the topographical elements are protrusions aligned in a set of evenly spaced rows across at least a portion of the surface. In certain embodiments, the asymmetric, three-dimensional pattern of topographical elements comprise at least one or a plurality of saw-toothed, columnar, ridge or pyramidal shaped elements. In certain embodiments, the topographical elements are saw-tooth protrusions aligned in a set of evenly spaced rows across at least a portion of the surface.

In certain embodiments, the saw tooth protrusions are from about 0.4 to about 2.5 microns in height, from about 0.8 to about 8.0 microns in length, from about 0.1 to about 0.8 microns in width and from about 0.8 and to about 2.2 microns in spacing between consecutive protrusions along the path or between rows. In certain embodiments, the saw tooth protrusions are from about 0.1 to about 3.0 microns in height. In certain embodiments, the saw tooth protrusions are from about 0.05 to about 1.00 micron in width. In certain embodiments, the saw tooth protrusions are from about 0.3 to about 20.0 microns in length. In certain embodiments, the saw tooth protrusions have a repeat distance from about 0.3 to about 25.0 microns. In certain embodiments, the saw tooth protrusions have a pitch of from about 0.2 to about 6.0 microns. In certain embodiments, the saw tooth protrusions have an offset distance from about 0 to about 12.5 microns. In certain embodiments, the method comprises movement of the cell across a distance of at least about 5 microns.

In certain aspects, the invention relates to a method of inducing directional movement of a cell comprising contacting the cell to a surface comprising a three-dimensional pattern of one or a plurality of asymmetric topographical elements for a time period sufficient to bias actin polymerization within the cell, wherein the topographical elements are from about 0.001 to about 100 microns in height or width or depth and aligned along at least one or a plurality of straight, curved or circumferential paths on the surface. In certain embodiments, the movement is across a distance of at least about 5 microns.

In certain aspects, the invention relates to a method of directing or harnessing an actin wave within a cell, the method comprising contacting the cell to a surface comprising a three-dimensional pattern of one or a plurality of asymmetric topographical elements for a time period sufficient to bias actin polymerization within the cell, wherein the topographical elements are from about 0.001 to about 100 microns in height or width or depth and aligned along at least one or a plurality of straight, curved or circumferential paths on the surface. In certain embodiments, the movement is across a distance of at least about 5 microns.

In certain aspects, the invention relates to a composition comprising a contact side, wherein at least a portion of the contact side comprises a cell contact portion comprising a three-dimensional pattern of one or a plurality of asymmetric topographical elements, the topographical elements are from about 0.001 to about 100 microns in height or width or depth and aligned along at least one or a plurality of straight, curved or circumferential paths on the cell contact portion. In certain embodiments, the composition is a wound dressing, wherein the contact side is a subject contact side and the wound dressing comprises an oppositely facing side, wherein the subject contact side comprises: (i) an elastic, adhesive portion comprising a skin adhesive configured for adhering to a subject's skin proximate to a wound; and (ii) a wound portion comprising a non-adhesive material configured for placement over a wound, wherein the wound portion comprises the asymmetric, three-dimensional pattern of one or the plurality of topographical elements; and wherein the wound dressing is free of a chemical gradient. In certain embodiments, the asymmetric, three-dimensional pattern of one or the plurality of topographical elements induce directional movement of one or a plurality of cells along the at least one or the plurality of straight, curved or circumferential paths on the cell contact portion.

In certain embodiments, the asymmetric, three-dimensional pattern comprises one or a plurality of offset, parallel paths of saw tooth-shaped protrusions, wherein the protrusions have a repeat distance from about 0.3 to about 25.0 microns, a pitch of from about 0.2 to about 6.0 microns, and an offset distance from about 0 to about 12.5 microns. In certain embodiments, the composition is an implant configured to be implanted within in a subject, wherein the contact side is an outer surface of the implant, and wherein the implant is free of a chemical gradient.

In certain aspects the invention relates to a method of inducing healing of a wound of a subject comprising contacting the wound with the composition of claim 17 for a time period sufficient to bias actin polymerization within a plurality of cells at, adjacent to or proximate to the wound such that the cells are unidirectionally migrate. In certain embodiments, the composition comprises a surface configured for contacting a wound wherein the surface comprises an asymmetric, three-dimensional pattern comprising one or a plurality of offset, parallel paths of saw tooth-shaped protrusions, wherein the protrusions have a repeat distance from about 0.3 to about 25.0 microns, a pitch of from about 0.2 to about 6.0 microns, and an offset distance from about 0 to about 12.5 microns.

BRIEF DESCRIPTION OF THE DRAWINGS

FIG. 2A-FIG. 2J. Unidirectional cell migration is sensitive to details of the nano/microtopography. On 8-µm sawteeth, cells migrate up the slant (FIG. 2A-FIG. 2E), whereas on 2-µm sawteeth, they migrate down the slant (FIG. 2F-FIG. 2J). (FIG. 2A and FIG. 2F) Polar histograms of the direction of motion. (FIG. 2B and FIG. 2G) Probability distributions of the direction of motion weighted by speed. The solid line is an average over three experiments, The shaded area represents the SE. (FIG. 2C and FIG. 2H) Cartoons illustrate the definitions of the angles used to describe cell motion relative lo the sawteeth. (FIG. 2D and FIG. 2I) Probability densities of cellular velocity with respect to the sawtooth orientation. Inset shows the speed distribution and range for each quartile. (FIG. 2E and FIG. 2J) Probability densities of cellular alignment with respect to the sawtooth orientation. The alignment direction is corrected by the direction of motion. Insets show the eccentricity distribution and range for each quartile.

FIG. 3A-FIG. 3L. Actin morphology and flux for *D. discoideum* depend on details of the nano/microtopography. (FIG. 3A-FIG. 3L) Eight-micron sawteeth (FIG. 3A-FIG. 3F) and 2-μm sawteeth (FIG. 3G-FIG. 3L). (FIG. 3A and FIG. 3G) Top-view confocal micrographs of F-actin on sawteeth. (FIG. 3B, FIG. 3C, FIG. 3H, and FIG. 3I) Confocal micrographs of cross-sections perpendicular to the ridges going through the sawtooth minima (FIG. 3B and FIG. 3H) and maxima (FIG. 3C and FIG. 3I). (FIG. 3D and FIG. 3J) Actinwave directionality. (FIG. 3E and FIG. 3K) Average actin flux around a sawtooth. (FIG. 3F and FIG. 3L) Sixty-frame (2.55-min) space/time plot of actin waves along a ridge. (Scale bars: FIG. 3A-FIG. 3C and FIG. 3G and FIG. 3I, 3 μm; FIG. 3F, 16 μm; L, 4 μm.)

(FIG. 4C and FIG. 4F) Directionality of actin waves on 8-μm sawteeth (FIG. 4C) and 2-μm sawteeth (FIG. 4F). (FIG. 4D) Space/time plot of actin waves along a ridge over 146 frames (4.83 min). (FIG. 4E and FIG. 4G) Actin-wave propagation speed. *P :S 0.05; ***P :S 0.001. (Scale bars: FIG. 4A and FIG. 4B, 4 μm; FIG. 4D, 8 μm.)

FIG. 5A-FIG. 5C shows unidirectional guidance of cell motion by a surface of offset, 2-μm sawteeth. (FIG. 5A and FIG. 5B) Schematic diagram (FIG. 5A) and side-view scanning electron micrograph (FIG. 5B) of the offset sawteeth. (FIG. 5C) Probability distribution of direction of motion weighted by speed, averaged over three experiments. (Scale bar: FIG. 5B, 1 μm).

FIG. 6A-FIG. 6C shows perpendicular bidirectional guidance of cell motion by continuous, 8-μm sawteeth. (FIG. 6A and FIG. 6B) Schematic diagram (FIG. 6A) and scanning electron micrograph (FIG. 6B) of the sawtooth film. (FIG. 6C) Probability distribution of direction of motion weighted by speed. (Scale bar: FIG. 6B, 10 μm.)

FIG. 8 shows a space/time plot of a resized actin wave traveling along a single ridge. The bright-field image on the left shows the orientation of the sawteeth. The speeds of actin waves traveling up and down the saw teeth measured in this space/lime plot are 7.3 and 4.5 μm/min, respectively.

FIG. 10A-FIG. 10B shows weighted velocity of aca- *D. discoideum*. (FIG. 10A) Cells migrating preferentially up the long side of saw-teeth slants with a long sawtooth length (towards 0 degrees). (FIG. 10B) Cells migrating preferentially down the long side of sawteeth slants with a short sawtooth length (towards 180 degrees).

FIG. 11 shows the terms used to describe the dimensions of the sawteeth.

In FIG. 12E and FIG. 12F, there are n=150 cells on the at surface and n=141 cells on the ridged surface from N=2 days of experiments. (FIG. 12G) Actin stain and (FIG. 12H) tubulin stain of fixed M1 cells on 2-μm-spaced ridges. The ridges are horizontally oriented.

DETAILED DESCRIPTION OF EMBODIMENTS

Figure 1A:
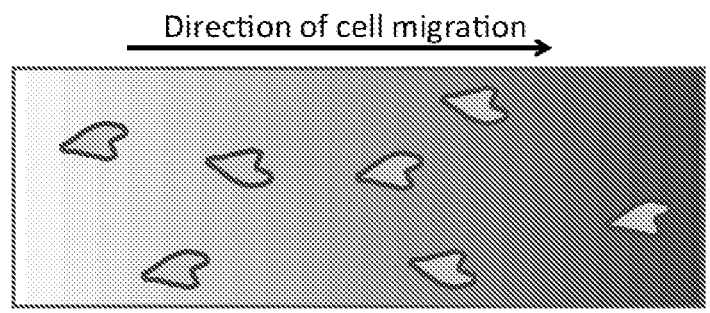
FIG. 1A shows a side-view scanning electron micrograph of nano-saw teeth with a length of 6 µm, a height of 1.8 µm, and a width of 630 nm. The spacing between adjacent sawtooth ridges is 2 µm.

This invention involves asymmetric nanotopographic surfaces that guide cell migration persistently and unidirectionally. In established unidirectional cell guidance schemes that dependon gradients, such as gradients in chemical properties (chemotaxis) or gradients in mechanical properties (durotaxis), the guidance cue is a large scale gradient, which means that chemical properties or mechanical properties have to change significantly over large lengthscales. Since cells can only sense gradients when the signal itself (chemical or mechanical) is within a given dynamic range, the largest distance over which gradient based unidirectional guidance is possible is limited.

In contrast, the unidirectional contact guidance achieved by the present invention does not require a global, external gradient. instead asymmetries in surface topography on scales comparable to and smaller than the scale of cells are used for guiding cell migration without large scale gradients. Guidance of cell migration can therefore be achieved over arbitrarily long distances. Furthermore, guidance can he achieved through asymmetries in surface topography without the need to confine the cells.

In natural biological environments, cells typically migrate on the extracellular matrix (ECM). It has been suggested that the ECM not only provides structural support for the cells, but also guides cell migration directionally with micro- and nano-scale topography. Therefore, biocompatible substrates with appropriate micro- and/or nano-scale features may direct cell migration via membrane-substrate contact guidance. Anisotropic micro- and nano-topography can not only bias the polarization and orientation of cells, but can also lead to contact guidance via the coupling between the cytoskeleton and patterned surface. Thus, appropriate topography can result in persistent directional cell migration. Note that the topographic surfaces need not be flat on macroscopic distance scales. The surfaces can be curved or even assembled into three-dimensional structures such as tribes. The surfaces can also be chemically functionalized to promote favorable interactions with the cells that are to be guided.

In one embodiment of this invention, rows or paths of sawteeth that have widths of hundreds of milometers and lengths of several microns are used to effect contact guidance with a preferred orientation. These patterns can be created, for instance, using multiphoton absorption polymerization (NAP) to fabricate a master surface with nanotopographic features. The nanotopographic surface is then molded from the master using composite polydimethylsiloxane (PDMS). The composite PDMS mold consists of a thin layer of hard PDMS (which is rigid), allowing for high-resolution molding, and a slab of soft PDMS (which is flexible), preventing the cracking of the hard PDMS. The nanotopographic surface is then replicated from the composite PDMS mold with high fidelity. An example of such a sawtooth pattern is illustrated in FIG. 16.

This concept has been reduced to practice using the model cell system *Dictyostelium discoideum* on a surface composed of asymmetric nanosawteeth. This example, Aca- *D. discoideum*, which cannot secrete chemoattractant or relay signals, was used to prevent competing guidance effects due to chemical signal relay. Time lapse serial images of fluorescently dyed aca- *D. discoideum* cells were taken and the cells' migration velocity was analyzed. Cells preferentially migrated up the long side of the sawtooth slants with a long sawtooth length (FIG. 10*a*), but migrate down the long side of sawtooth slants with a short sawtooth length (FIG. 10*b*). Thus, parameters such as the length, the alignment, the width, and the height of the sawteeth can be used to optimize the contact guidance process. As the optimal values of these parameters may vary from cell type to cell type, they can also be used to make surfaces that are designed to guide specific cell types while not affecting other cell types. The sawteeth illustrated here are but one example of an asymmetric surface topography that can effect unidirectional contact guidance.

Unless defined otherwise, all technical and scientific terms have the same meaning as is commonly understood by one of ordinary skill in the art to which the embodiments disclosed belongs.

As used herein, the terms "a" or "an" means that "at least one" or "one or more" unless the context clearly indicates otherwise.

As used herein, the term "about" means that the numerical value is approximate and small variations would not significantly affect the practice of the disclosed embodiments. Where a numerical limitation is used, unless indicated otherwise by the context, "about" means the numerical value can vary by ±20%, ±15%, ±10%, ±9%, ±8%, ±7%, ±6%, ±5%, ±4%, ±3%, ±2%, ±1%, ±0.5%, ±0.4%, ±0.3%, ±0.2%, or ±0.1% and remain within the scope of the disclosed embodiments.

As used herein, the term "animal" includes, but is not limited to, humans and non-human vertebrates such as wild, domestic, and farm animals. The terms "animal," "patient," and "subject" as used herein include, but are not limited to, humans and non-human vertebrates such as wild, domestic and farm animals. In some embodiments, the terms "animal," "patient," and "subject" may refer to humans. In some embodiments, the terms "animal," "patient," and "subject" may refer to non-human mammals. In some embodiments, the terms "animal," "patient," and "subject" may refer to any or combination of: dogs, cats, pigs, cows, horses, goats, sheep or other domesticated non-human mammals. In some embodiments, the subject is a human patient with a wound and is need of a wound dressing to induce, to protect and/or to encourage wound healing.

As used herein, the phrase "therapeutically effective area" of a composition or wound dressing disclosed herein can be measured by calculating how quickly a wound may close or heal in the presence of the pattern of topographical elements in comparison to how quickly a wound may close or heal in the absence of the same pattern of topographical elements. In some embodiments, a therapeutically effective amount is the amount of one or a plurality of topographical elements disclosed herein that induces the closure, reduces the severity of scarring or the time to heal, or removes at least a portion of a wound from the skin or tissue of a subject who has been wounded or is likely to be wounded. In some embodiments, the therapeutically effective induces the closure of a wound faster than a wound untreated by the same he pattern of topographical elements by at least 10%, by at least 20%, by at least 30%, by at least 40%, by at least 50%, by at least 60%, by at least 70%, by at least 80%, by at least 90%, or by at least 95%. In some embodiments, an "effective area" is also a "therapeutically effective area" whereby the pattern of asymmetric topographical elements reduces or eliminates at least one harmful effect of a subject having a wound that requires healing.

The disclosure relates to a method of inducing healing of a wound of a subject comprising contacting the wound with any of the disclosed compositions for a time period sufficient to bias actin polymerization within a plurality of cells at, adjacent to or proximate to the wound such that the cells unidirectionally move in response to the contact. The disclosure relates to a method of inducing healing of a wound of a subject comprising contacting the wound with a therapeutically effective area of any one or more of the disclosed surfaces for a time period sufficient to bias actin polymerization within a plurality of cells at, adjacent to or proximate to the wound such that the cells unidirectionally move in response to the contacting.

The disclosure also relates to a method of inducing healing of a wound of a subject comprising contacting the wound with the composition of claim 17 for a time period sufficient to bias actin polymerization within a plurality of cells at, adjacent to or proximate to the wound such that the cells unidirectionally move toward or away from a direction defined by the sidedness of the asymmetric uppermost points of the topographical elements. In some embodiments, the method is performed without contact or exposure of the wound to a chemical gradient. In some embodiments, the method is performed whereby the only substantial action polymerization bias is being accomplished by contact of the cell or plurality of cells to the topographical elements.

As used herein, the term "bias" means to push or prejudice a cell to move in a predetermined direction. In some embodiments, the compositions disclosed herein create an physical environment whereby the normal actin polymerization in a cell is biased in favor of moving one direction rather than another direction. In some embodiments, the methods disclosed herein accomplish this bias, particularly the actin polymerization bias, by contact of the cell with the patterned asymmetric topographical elements for a time period sufficient to cause movement over a predetermined distance. In some embodiments, the predetermined distance is about 1 micron, 5 microns, 10 microns, 20 microns, 30 microns, 40 microns, 50 microns, 60 microns, 70 microns, 80 microns, 90 microns, 100 microns, 500 microns, 1000 microns, 2000 microns, or about 1 millimeter. In some embodiments, the methods are free of exposure of the cells to chemical gradients capable of causing cellular chemotaxis. In some embodiments, the methods are free of exposure of the cells to analytes or substances capable of causing actin polymerization bias due to cell receptor-based biasing.

As used herein, the term "composition" means at least one solid surface configured for contact with one or a plurality of cells, or at least one solid surface configured for contact with a wound, either within or on a subject. In some embodiments, the composition is any structure configured to be in contact with one or a plurality of cells. In some embodiments, the composition is a wound dressing or an implant. The composition includes a contact side, a portion of the contact side including a cell contact portion including an asymmetric, three-dimensional pattern of one or a plurality of topographical elements, the topographical elements are from about 0.001 to about 100 microns in height or width or depth and aligned along at least one or a plurality of straight, curved or circumferential paths on the cell contact portion. In embodiments where the composition is a wound dressing, the contact side is a subject contact side and the wound dressing includes an oppositely facing side, the subject contact side including an elastic, adhesive portion including a skin adhesive configured for adhering to a subject's skin proximate to a wound; and a wound portion including an absorbent and non-adhesive material configured for placement over a wound, the wound portion including the asymmetric, three-dimensional pattern of one or the plurality of topographical elements; and the wound dressing is free of a chemical gradient. In embodiments where the composition is an implant configured to be implanted within in a subject, the contact side is an outer surface of the implant, and the implant is free of a chemical gradient.

As used herein, the term "base" means a substantially planar surface (e.g., flat or curved) upon which the topographical elements are disposed.

As used herein, the term "topographical element" means a saw-toothed, columnar, ridge or pyramidal shaped element extended from the base.

As used herein, the term "height" means a distance as measured between the base and an uppermost point of the topographical element.

As used herein, the term "width" means a distance as measured between opposing sides of the topographical element.

As used herein, the term "length" means a distance as measured between a leading edge and an opposing trailing edge of the topographical element.

As used herein, the term "pitch" means a distance as measured between sides (e.g., non-leading or trailing edge sides) of two adjacently disposed topographical elements, the topographical elements disposed in adjacent rows on the base.

As used herein, the term "repeat distance" means a distance as measured between a trailing edge of a first topographical element and a trailing edge of a second, adjacently disposed topographical elements, the topographical elements aligned in a single row on the base.

As used herein, the term "offset" means a distance as measured between a trailing edge of a first topographical element in a first row of topographical elements and a leading edge of a second topographical element in a second, adjacently disposed row of topographical elements.

The topographical elements in one row are offset or staggered relative to topographical elements in an adjacent row by the offset distance such that movement of the cells is induced in the direction of the rows.

As used herein, the term "saw-toothed shaped" means a topographical element defining a substantially triangular configuration with a leading edge defining the first point of the triangle, the trailing edge defining the second point of the triangle, and the uppermost point defining the third point of the triangle, a base of the triangle extending between the leading and trailing edges and disposed against the base. In some embodiments, the angle of the leading edge between the uppermost point and the first point of the triangle can be dimensioned differently from the angle of the trailing edge between the uppermost point and the second point of the triangle. In some embodiments, the angle of the leading edge between the uppermost point and the first point of the triangle can be dimensioned equally from the angle of the trailing edge between the uppermost point and the second point of the triangle. In some embodiments, the uppermost point of the triangle (as measured from the base to the top of the triangle) is offset from the center point of the triangle base such that the line or plane describing height with uppermost point is askew from the height plane or height line including the center point of the sawtooth length. In some embodiments, the topographical element, such as the saw-tooth, is asymmetric, such that the leading edge of the triangle has a lower slope than the slope of the trailing edge of the triangle. In some embodiments, the uppermost point of the triangle is directly above or substantially directly above the end point of the trailing edge of the triangle creating an angle between the two points of about zero degrees (creating a right-angled triangle as two faces of the sawtooth).

As used herein, the term "columnar shaped" or "column-shaped" means a topographical element defining a protrusion extending from the base with a rectangular, square, circular, oval or triangular cross-sectional configuration.

As used herein, the term "ridge shaped" means a topographical element defining a protrusion extending substantially continuously the length of the base without gaps in-between. In some embodiments, a base includes a plurality of ridge shaped topographical elements extending in a spaced and parallel configuration.

As used herein, the term "pyramidal shaped" means a topographical element having a polygonal base (e.g., square or triangular) disposed against the base and sloping sides that meet in an uppermost point or surface, the uppermost point or surface defining the top of the topographical element.

Compositions

The compositions disclosed herein can be used to induce unidirectional movement of one or a plurality of cells (or a sheet of cells) along straight, curved or circumferential paths formed by the asymmetric, three-dimensional pattern of topographical elements. The compositions can be used with any cell type, such as for example cells heaving a radius or overall length of between from about 3 µm to about 30 µm, from about 5 µm to about 25 µm, from about 10 µm to about 20 µm, or from about 15 µm to about 30 µm, or the like. The compositions (or the surface having the pattern of topographical elements) can be of different dimensions, such as for example, about 1 mm$^2$, about 5 mm$^2$, about 10 mm$^2$, about 50 mm$^2$, about 1 cm$^2$, about 5 cm$^2$, about 10 cm$^2$, about 50 cm$^2$, or the like. In some embodiments, the compositions can be in the form of a large sheet (e.g., multiple m$^2$ that is cut into smaller pieces. In some embodiments, the compositions (or the surface having the pattern of topographical elements) can be in the form of a wrap having a width of, e.g., about 5 cm, and a length of about, e.g., 100 cm or more, such that the composition can be unrolled and wrapped around a portion of the subject.

The compositions can be in the form of a solid surface configured for contact with cells, such as with a wound within or on a subject. For example, the compositions can be incorporated into a wound dressing (e.g., a bandage) including a contact surface with the pattern of topographical elements and a surrounding surface with adhesive. As a further example, the compositions can be incorporated into a wound dressing or wrap with one surface of the wound dressing or wrap including the pattern of topographical elements across a therapeutically effective area, such that the wound dressing or wrap can be wrapped around a limb, tissue or bone of the subject. As a further example, the compositions can be incorporated into an implant configured to be implanted within a subject, the implant having a surface configured to be in contact with cells and having the pattern of topographical elements.

FIG. 11 shows a diagrammatic representation of an exemplary composition including an asymmetric, three-dimensional pattern of topographical elements aligned in three rows or paths and defining saw-toothed shaped elements. Although extending in three linear rows, in some embodiments, the topographical elements can be aligned along curved or circumferential paths on the base. although shown as saw-toothed shapes, in some embodiments, the topographical elements can be columnar, ridge or pyramidal shaped. In some embodiments, the composition can include topographical elements having mixed configurations (e.g., one or more combinations of saw-toothed, columnar, ridge and/or pyramidal shaped).

In some embodiment, the height of each topographical element can be between, e.g., from about 0.001 μm to about 100.0 μm, from about 0.1 μm to about 5.0 μm, from about 0.2 μm to about 4.5 μm, from about 0.3 μm to about 4.0 μm, from about 0.5 μm to about 3.5 μm, from about 1.0 μm to about 3.0 μm, from about 1.5 μm to about 2.5 μm, from about 2.0 μm, or the like. In one embodiment, the width of each topographical element can be between, e.g., from about 0.001 μm to about 100.0 μm, from about 0.01 μm to about 5.0 μm, from about 0.05 μm to about 3.0 μm, from about 0.06 μm to about 2.5 μm, from about 0.7 μm to about 2.0 μm, from about 0.8 to about 1.5 μm, from about 0.9 μm to about 1.3 μm, about 1.0 μm, about 0.8 μm, about 0.05 to about 1.0 μm, or the like.

In one embodiment, the length of each topographical element can be between, e.g., from about 0.001 μm to about 100.0 μm, from about 0.3 μm to about 20.0 μm, from about 0.5 μm to about 18.0 μm, from about 1.0 μm to about 15.0 μm, from about 2.0 μm to about 13.0 μm, from about 5.0 μm to about 11.0 μm, from about 7.0 μm to about 10.0 μm, about 9.0 μm, or the like. In some embodiments, the pitch between the rows of topographical elements can be between, e.g., from about 0.001 μm to about 100.0 μm, from about 0.2 mm to about 6.0 μm, from about 0.5 μm to about 5.0 μm, from about 1.0 μm to about 5.0 μm, from about 1.5 μm to about 4.5 μm, from about 2.0 μm to about 4.0 μm, from about 2.5 μm to about 3.5 μm, from about 3.0 μm, or about X microns, wherein X is any integer from 1 to 30.

In some embodiments, the topographical elements comprise a length of about 300 nanometers. In some embodiments, the topographical elements comprise a length of about 400 nanometers. In some embodiments, the topographical elements comprise a length of about 500 nanometers. In some embodiments, the topographical elements comprise a length of about 600 nanometers. In some embodiments, the topographical elements comprise a length of about 700 nanometers. In some embodiments, the topographical elements comprise a length of about 800 nanometers. In some embodiments, the topographical elements comprise a length of about 900 nanometers. In some embodiments, the topographical elements comprise a length of about 1000 nanometers. In some embodiments, the topographical elements comprise a length of about 1100 nanometers. In some embodiments, the topographical elements comprise a length of about 1200 nanometers. In some embodiments, the topographical elements comprise a length of about 1300 nanometers. In some embodiments, the topographical elements comprise a length of about 1400 nanometers. In some embodiments, the topographical elements comprise a length of about 1500 nanometers. In some embodiments, the topographical elements comprise a length of about 1600 nanometers. In some embodiments, the topographical elements comprise a length of about 1700 nanometers. In some embodiments, the topographical elements comprise a length of about 1800 nanometers. In some embodiments, the topographical elements comprise a length of about 1900 nanometers. In some embodiments, the topographical elements comprise a length of about 2000 nanometers.

In some embodiments, the topographical element is about 500 nanometers in height. In some embodiments, the topographical element is about 600 nanometers in height. In some embodiments, the topographical element is about 700 nanometers in height. In some embodiments, the topographical element is about 800 nanometers in height. In some embodiments, the topographical element is about 900 nanometers in height. In some embodiments, the topographical element is about 1000 nanometers in height. In some embodiments, the topographical element is about 1100 nanometers in height. In some embodiments, the topographical element is about 1200 nanometers in height. In some embodiments, the topographical element is about 1300 nanometers in height. In some embodiments, the topographical element is about 1400 nanometers in height. In some embodiments, the topographical element is about 1500 nanometers in height.

In some embodiments, topographical elements in a row or in a path are about 1.4 microns apart from the trailing edge of one element to the leading edge of another element. In some embodiments, topographical elements in a row or in a path are about 1.5 microns apart from the trailing edge of one element to the leading edge of another element. In some embodiments, topographical elements in a row or in a path are about 1.6 microns apart from the trailing edge of one element to the leading edge of another element. In some embodiments, topographical elements in a row or in a path are about 1.7 microns apart from the trailing edge of one element to the leading edge of another element. In some embodiments, topographical elements in a row or in a path are about 1.8 microns apart from the trailing edge of one element to the leading edge of another element. In some embodiments, topographical elements in a row or in a path are about 1.9 microns apart from the trailing edge of one element to the leading edge of another element. In some embodiments, topographical elements in a row or in a path are about 2.0 microns apart from the trailing edge of one element to the leading edge of another element. In some embodiments, topographical elements in a row or in a path are about 2.1 microns apart from the trailing edge of one element to the leading edge of another element. In some embodiments, topographical elements in a row or in a path are about 2.2 microns apart from the trailing edge of one element to the leading edge of another element. In some embodiments, topographical elements in a row or in a path are about 2.3 microns apart from the trailing edge of one element to the leading edge of another element.

In one embodiment, the repeat distance of the topographical elements can be between, e.g., from about 0.001 μm to about 100.0 μm, from about 0.3 μm to about 25.0 μm, from about 0.5 μm to about 20.0 μm, from about 1.0 μm to about 18.0 μm, from about 3.0 μm to about 15.0 μm, from about 5.0 μm to about 13.0 μm, from about 7.0 μm to about 10.0 μm, from about 9.0 μm, or the like. In one embodiment, the offset of the topographical elements can be between, e.g., about from 0.001 μm to about 100.0 μm, from about 0.0 μm to about 20.0 μm, from about 0.0 μm to about 12.5 μm, from about 0.5 μm to about 10.0 μm, from about 1.0 μm to about 8.0 μm, about 2.5 μm to about 7.0 μm, about 4.0 μm to about 6.0 μm, about 5.0 μm, or the like.

In some embodiments, the offset can be selected such that the topographical elements in one row substantially cover the gaps or spaces between the topographical elements in an adjacent row (as viewed from the side). In some embodiments, the offset can be selected such that the topographical elements in one row leave a gap or space of less than 5.0 µm between the topographical elements in an adjacent row (as viewed from the side).

The composition of the disclosure can be of any physical form that has a surface, such as a non-absorbent surface configured for placement over a wound of a subject.

Medical Adhesive Bandages

In certain embodiments, the sawtooth surfaces described herein are used in the preparation of a medical adhesive bandage. Preparation of medical adhesive bandages is described, for example, in US2007/0010777, which is incorporated by reference herein it its entirety. Medical adhesive bandages may comprise a backing with two major surfaces, i.e., an outer major surface and an inner major surface, a reinforcing scrim, and a layer of pressure-sensitive adhesive disposed on the inner major surface thereof. The medical adhesive bandage further comprises an absorbent pad on the inner major surface.

Backing

Materials for the preparation of backings of medical adhesive bandages include, but are not limited to, polyethylene, other polyolefins, and polyurethane polymers and blends of such materials. Examples of suitable polymers for the backing include thermoplastic polymers, such as thermoplastic polymers that can be extruded (e.g., using a blown film or cast film extrusion process). Representative examples of thermoplastic polymers include polyolefins (e.g., low density polyethylene (LDPE), high density polyethylene (HDPE), linear low density polyethylene (LLDPE), polypropylene and polybutylene), polyester, copolyester, polyamide (e.g., nylon), polyvinyl chloride, polycarbonate, polytetrafluoroethylene, and mixtures thereof. One example of a suitable alternative is low density polyethylene commercially available under the trade designation "LD 129" from ExxonMobil Chemicals.

For example, an approximately 0.0025 inch aluminum pigmented polyethylene film can be used if desired. Typically the tape is reinforced with a polyester scrim to enhance its strength properties. Selection of scrim material may be made to achieve desired properties, e.g., to provide elasticity in the longitudinal direction coupled with desired tear strength properties.

It will typically be preferred to perforate at least a portion of the backing with holes or channels that extend completely through the backing to facilitate passage of moisture from the wearer through the medical article. The holes may be arranged in any desired manner.

Scrim

Medical adhesive bandages may comprise a reinforcing scrim. The scrim may be embedded within the backing or be bonded to the first major surface thereof. The reinforcing scrim may, if desired, be a non-woven scrim. More typically, however, the scrim will typically be a woven or knitted scrim that is readily tearable in at least the cross-web direction. The scrim includes a plurality of warp elements oriented in the machine or down-web direction of the scrim and a plurality of weft elements that are oriented in the cross-web direction of the scrim. The warp elements are typically arranged such that they are uniformly spaced and substantially parallel to one another. Similarly, the weft elements are typically arranged such that they are uniformly spaced and substantially parallel to the other weft elements. Relative to one another, the warp elements are substantially perpendicular to the weft elements. The warp and weft elements may comprise filaments, multi-filaments (i.e., filament bundles), yarns, threads, or a combination thereof. The elements may be twisted or textured, for example, to add loft and/or stretch to the scrim. The warp and weft elements are typically combined by a weaving or knitting process to form the scrim.

The scrim may be made of natural materials or synthetic materials. Illustrative examples of natural materials include cotton, silk, hemp, flax, and combinations thereof. Examples of synthetic materials include polyester, acrylic, polyolefin (e.g., polyethylene and polypropylene), nylon and combinations thereof. Natural materials and synthetic materials may also be combined, for example, in a 65/35 polyester/cotton blend or a 80/20 polyester/cotton blend.

Representative examples of commercially available scrims include those manufactured by American Fiber & Finishing, Inc. (Newberry, S.C.) having a 70 denier multi-filament polyester warp yarn and a 150 denier multi-filament polyester weft yarn woven in a one-over-one weave and having a scrim density of 30 warp/inchx10 weft/inch (12 warp/cmx4 weft/cm), 30 warp/inchx8 weft/inch (12 warp/cmx3 weft/cm), 25 warp/inchx7 weft/inch (10 warp/cmx3 weft/cm), 22 warp/inchx7 weft/inch (9 warp/cmx3 weft/cm), or 20 warp/inchx6 weft/inch (8 warp/cmx2 weft/cm).

Fibers used to make the reinforcing layer can be individual or in bundles, and those fibers and/or bundles of fibers can be randomly disposed to form a non-woven reinforcing layer, or can be disposed in a rectangular pattern with space between the fibers or bundles to form a reinforcing layer that can be manually broken at the intersections between the woven fibers or bundles when the backing layer is torn to guide straight line tearing of the tape in either of two directions at right angles to each other. When the fibers are in bundles they should be disposed so that they can easily be wetted by the adhesive (i.e., fibers in bundles that are twisted, knitted, tacked at close intervals or are in non-woven layers have been found to be more difficult to wet than when the fibers are loosely laid in the bundles) and should have diameters that are sufficiently small so that almost all of the fibers in the bundles will be wetted by the adhesive when the tape is applied to a substrate.

Adhesive

The preferred pressure sensitive adhesives which can be used in the medical adhesive articles of the present invention are adhesives which are known to be useful for application to skin. Examples of adhesives include those disclosed in U.S. Pat. No. 6,441,092. One particular example is a blend of 85 weight percent of 2-ethylhexyl acrylate/acrylic acid/ABP (96.5/3.5/0.05 weight ratio) and 15 weight percent Avalure AC 210 Acrylate copolymer. Adhesives containing from about 5 to about 20 weight percent of such hydrophilic materials provide a good balance of desired moisture permeability without unduly softening the adhesive layer to yield undesirable levels of residue. These adhesives can provide a desirable "breathability" that permits pass through of sweat from the skin surface, making tapes and bandages of the invention more comfortable when worn in hot conditions. Other illustrative examples of useful adhesives include those described in U.S. Pat. No. 4,112,177 (particularly the tackified acrylate "skin layer adhesive" described in Example 1), U.S. Pat. No. 5,648,166, acrylate copolymers as described in U.S. Pat. No. RE 24,906, and a 70:15:15 isooctyl acrylate:ethyleneoxide acrylate:acrylic acid terpolymer, as described in U.S. Pat. No. 4,737,410 (see Example 31). Other illustrative examples of useful adhesives are described in U.S. Pat. Nos. 3,389,827, 4,112,213, 4,310,509, 4,323,557, and 6,497,949. If desired, medicaments or antimicrobial agents may be included in the adhesive, for example, as described in U.S. Pat. Nos. 4,310,509 and 4,323,557. The choice of adhesives is limited to those that are safe to use on human or animal skin, and preferably to those that are of the class known as "hypoallergenic" adhesives. The preferred acrylate copolymers are adhesives of this class.

The adhesive layer may be of a thickness similar to those known in the art. For example, an adhesive layer of the above-described blend of 2-ethylhexyl acrylate/acrylic acid/ABP and Avalure™ AC 210 Acrylate copolymer coated at about 29 grains per 24 square inches of tape (a coating weight that is two to three times that typically used for bandages) has been found useful.

Absorbent Pad

Medical adhesive bandages further comprise an absorbent pad. The pad can be provided in any desired configuration, e.g., a rectangular portion that is smaller than the overall dimensions of the backing and preferably centered on the inner major surface of the backing. The pad may reach to one or both sides of the backing or may be completely surrounded by the adhesive as desired. It will be understood that, although the pad is typically generally rectangular and centered on the backing, it can take any appropriate shape and/or the pad can be located off-center on the backing as desired. The pad is typically absorbent, and can be manufactured from a number of materials including but not limited to, woven or nonwoven cotton, rayon, nonwovens, hydrocolloids, foams, and combinations thereof. If desired, the pad may also contain a number of substances, including antimicrobial agents, anesthetics, anti-itch agents, drugs for transdermal drug delivery, chemical indicators to monitor hormones or other substances in a patient, combinations thereof and the like.

Size/Configuration/Packaging

Medical adhesive bandages may be made in any desired configuration and size and may be packaged in many desired configurations, for example, in sterile packages. If desired, the inner side of the medical adhesive bandage, i.e., the surface to be applied to the skin of a wearer, may be covered with a removable liner.

Cells

Any cell type may be induced to move unidirectionally by contact of the cell to any one or plurality of patterned surfaces disclosed herein. In some embodiments, the cell is a neutrophil from one or any animal disclosed herein. In some embodiments, the cell is a epithelial cell from one or any animal disclosed herein. In some embodiments, the cell is a leukocyte from one or any animal disclosed herein. In some embodiments, the cell is from the phylum Amod: iozoa. In some embodiments, the cell is a blood cell from one or any animal disclosed herein.

*Diciyostehum discoideum*. In some embodiments, the cell is a human cell. In some embodiments, the cell is a eukaryotic cell. In some embodiments, the cell is in vivo, or part of a living tissue. In some embodiments, the cell is in vitro, or part of a solid phase structure comprising a surface configured for cell culture growth. In some embodiments, the composition is a tissue culture dish comprising any one of the patterns disclosed herein. In some embodiments, the methods of the disclosure relate to a method of culturing a cell in vitro on any one of the compositions disclosed herein comprising a patterns of topographical elements disclosed herein.

Methods

In certain aspects, the invention relates to a method of guiding unidirectional movement of a cell comprising exposing the cell to a surface comprising a three-dimensional pattern of one or a plurality of asymmetric topographical elements for a time period sufficient to bias actin polymerization within the cell, wherein the topographical elements are from about 0.001 to about 100 microns in height or width or depth and aligned along at least one or a plurality of straight, curved or circumferential paths on the surface.

In certain aspects, the invention relates to a method of inducing directional movement of a cell comprising contacting the cell to a surface comprising an asymmetric, three-dimensional pattern of one or a plurality of asymmetric topographical elements for a time period sufficient to bias actin polymerization within the cell, wherein the asymmetric topographical elements are from about 0.001 to about 100 microns in height or width or depth and aligned along at least one or a plurality of straight, curved or circumferential paths on the surface.

In certain aspects, the invention relates to a method of harnessing an actin wave within a cell, the method comprising contacting the cell to a surface comprising an asymmetric, three-dimensional pattern of one or a plurality of asymmetric topographical elements for a time period sufficient to bias actin polymerization within the cell, wherein the asymmetric topographical elements are from about 0.001 to about 100 microns in height or width or depth and aligned along at least one or a plurality of straight, curved or circumferential paths on the surface.

In certain aspects, the invention relates to a method of inducing healing of a wound of a subject comprising contacting the wound with a composition described herein for a time period sufficient to bias actin polymerization within a plurality of cells at, adjacent to or proximate to the wound such that the cells unidirectionally migrate.

In certain embodiments of the aforementioned methods, the asymmetric topographical elements are at least about 0.001 microns, about 0.005 microns, about 0.01 microns, about 0.05 microns, about 0.1 microns, about 0.5 microns, about 1.0 microns, about 5 microns, about 10 microns, about 50 microns, or about 100 microns in height or width or depth. In certain embodiments of the aforementioned methods, the asymmetric topographical elements are less than about 0.001 microns, about 0.005 microns, about 0.01 microns, about 0.05 microns, about 0.1 microns, about 0.5 microns, about 1.0 microns, about 5 microns, about 10 microns, about 50 microns, or about 100 microns in height or width or depth. Any of these values may be used to define a range for the height, width, or depth of the asymmetric topographical elements. For example, in some embodiments, the topical graphical element is about 0.001 microns to about 0.01 microns, about 0.1 microns to about I micron, or from about I micron to about 100 microns in height or width or depth.

The direction of movement of the cells relative to the structure of the asymmetric topographical elements may depend at least in part on cell type (e.g. an epithelial cell or a neutrophil). In some embodiments, the asymmetric topographical element (e.g. a sawtooth) has two sides, for example a shorter side and a longer side. In some embodiments the cell moves down the longer side of the asymmetric topographical element. In some embodiments, the cell move down the shorter side of the asymmetric topographical element. In some embodiments, the cell moves up the longer side. In some embodiments, the cells moved up the shorter side. In some embodiments, the sawtooth has two sides, wherein one side has a lower slope than the other side. In some embodiments, the cell moves down the side of the asymmetric topographical element that has a lower slope than the other side. In some embodiments, the cell moves down the side of the asymmetrical topographical element that has a higher slope than the other side. In some embodiments, the cell moves up the side of the asymmetrical topographical element that has the lower slope. In some embodiments, the cell moves up the side of the asymmetrical topographical element that has the higher slope.

The direction of movement of the cells relative to the structure of the asymmetric topographical elements may also depend at least in part on cell type (e.g. an epithelial cell or a neutrophil). For example, in some embodiments, the cells move parallel to the orientation of the asymmetric topographical element. In certain embodiments, the cells move perpendicular to the orientation of the asymmetric topographical element.

In some embodiments, the cells in the aforementioned methods are not exposed to a chemical gradient. In some embodiments, the cells in the aforementioned methods do not move by chemotaxis.

In some embodiments, the cells in the aforementioned methods move across a distance of at least about 0.1 microns, about 0.5 microns, about 1 micron, about 5 microns, about 10 microns, about 50 microns, about 100 microns, about 500 microns, about 1000 microns, about 5,000 microns, or about 10,000 microns. Any of these values may be used to define a range for the distance that the cell moves in the aforementioned methods. For example, in some embodiments, the cells move from about 0.1 microns to about 10,000 microns, from about 1 micron to about 10 microns, or from about 10 microns to about 1000 microns.

This invention is further illustrated by the following examples which should not be construed as limiting. Any of the references, patent applications or issued patents, journal articles disclosed in this application are incorporated by reference in their entireties.

EXAMPLES

Example 1

Figure 1B:
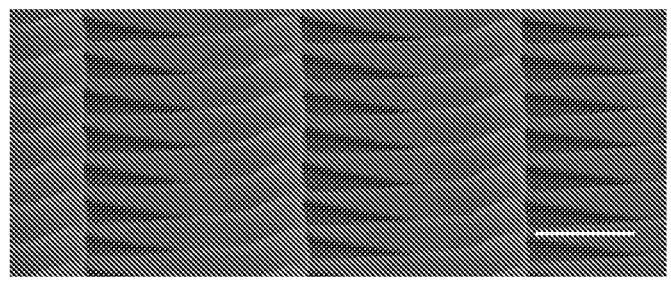
FIG. 1B shows a top-view, brightfield micrograph of a polarized cell on nano-sawteeth. The yellow dotted line delineates the cell boundary.
Figure 1C:
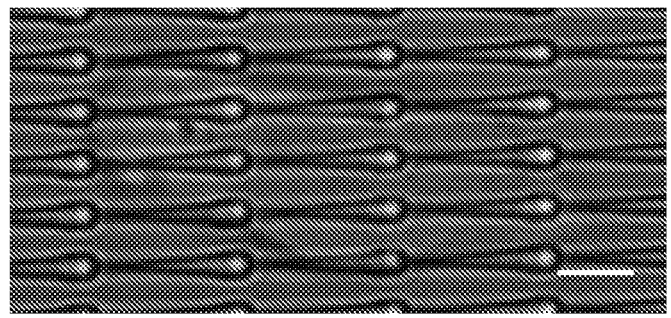
FIG. 1C shows a top-view confocal micrograph of a cAR1-YFP mutant cell on nano-sawteeth.

Movement of *Dictyostelium discoideum* Cells and Neutrophils Over Sawtooth Surfaces Surfaces composed of parallel ridges of sawteeth (FIG. 1B) were used to induce unidirectional guidance of cells. Although the length and height of the sawteeth reach more than 1 µm, the nanoscale features of the topography, in particular the width and radius of curvature of the sawtooth ridges, are critical for nucleating and guiding actin polymerization, the key internal guidance mechanism. Two prototypical cell types that move via amoeboid migration were investigated: *Dictyostelium discoideum*, which migrates using pseudopods that protrude away from surface contacts, and neutrophils, which migrate using lamellipodia that spread along surface contacts. The sawtooth dimensions (length, height, and width) and the spacing between adjacent sawtooth ridges are all comparable in size to natural collagen fibers (Wang et al., 2015, Langmuir 31(1):307-314) and are considerably smaller than the dimensions of an individual cell (the average width of a polarized cell is 5 µm for *D. discoideum* and 10 µm for neutrophils). Thus, individual cells span several ridges and many sawteeth (FIG. 1C).

Figure 1D:
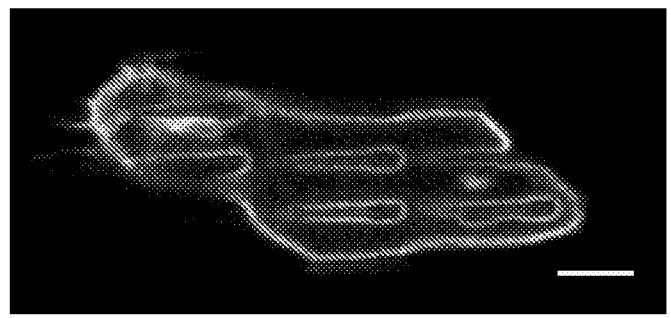
FIG. 1D shows a side-view confocal micrographs of four different cross-sections of a cAR1-YFP mutant cell on nano-sawteeth. The grey background schematic represents the nano-sawtooth surface. Each dashed line represents a plane perpendicular to the surface. Each cross-sectional image corresponds to the plane represented by the dashed line of the same color with the outline of the image. The scale bars in A-D represent 3 µm.
Figure 1E:
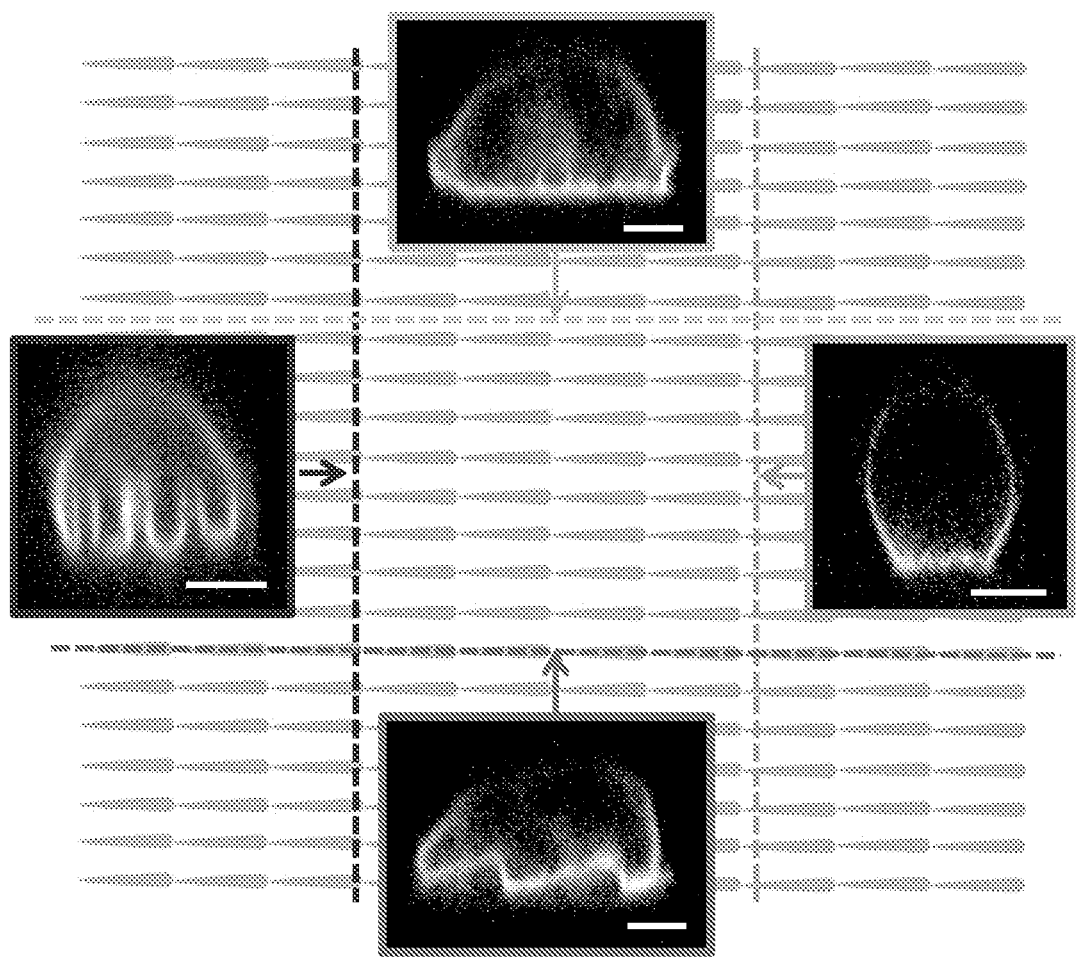
FIG. 1E shows the centroid motion of 25 representative cells over 18 min. All tracks were forced to begin at the origin, as represented by the black dot. The grey schematic (not to the scale) shows that height of each sawtooth increases from left to right. The scale bar is 20 µm.
Figure 1F:
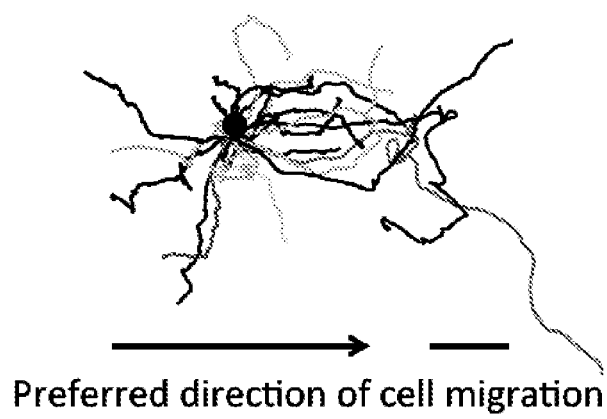
FIG. 1F shows a spider plot of cell trajectories.

To explore how *D. discoideum* conforms to sawteeth, we visualized YFP-labeled cAR1 (cyclic AMP receptor 1) cells, which express a fluorescent transmembrane protein that is uniformly distributed in the plasma membrane (Xiao et al., 1997, J Cell Biol 139(2): 365-374). FIG. 1D and 1E show top- and side-view fluorescent confocal images, respectively, of an individual cell on a sawtooth surface. The sawtooth boundary highlighted in the top-view image indicates that the cell membrane is in contact with the entire surface of each sawtooth, leading to an apparently thicker plasma membrane around the sawteeth and hence an increased cAR1-YFP density. Side-view images confirm that cells conform to the deepest and highest positions of sawteeth. To eliminate the possibility that cells are guided by chemical signals emitted by other cells, we imaged signal-relay-deficient aca- *D. discoideum* cells. We studied these cells under the conditions in which they are most capable of following a chemical gradient (starvation for 5 h), but we did not apply an external chemical gradient in our studies of microthigmotaxis. The cytoplasm was dyed with cellTracker Green (McCann et al., 2010, J Cell Sci 123 (PtlO): 1724-1731) to enable tracking of centroid motion. Representative tracks (FIG. 1F) exhibit substantial unidirectional bias up the sawtooth slope.

Figure 2D:
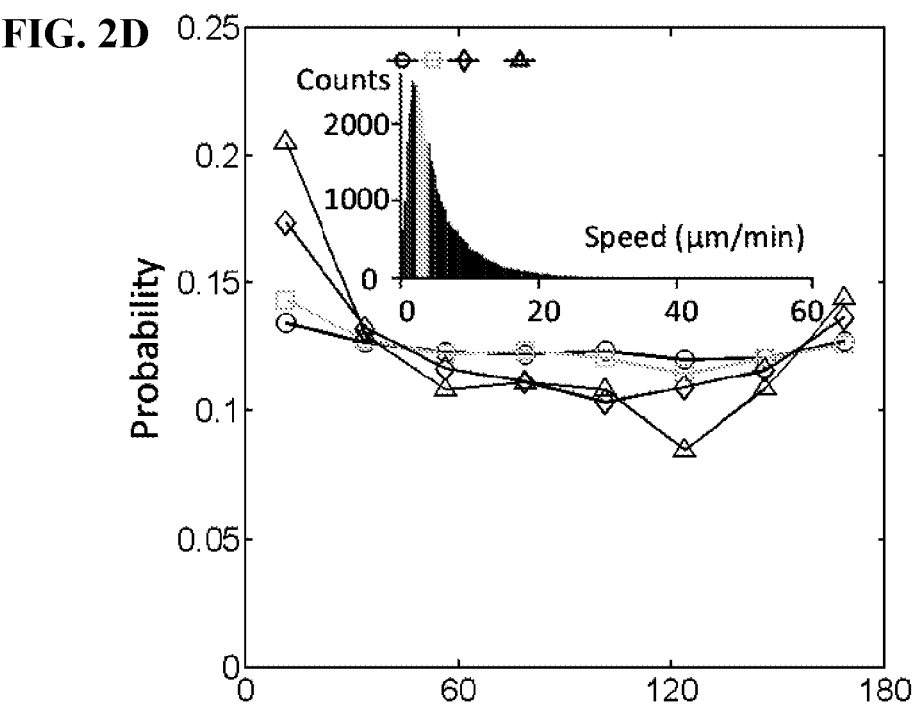
Figure 2E:
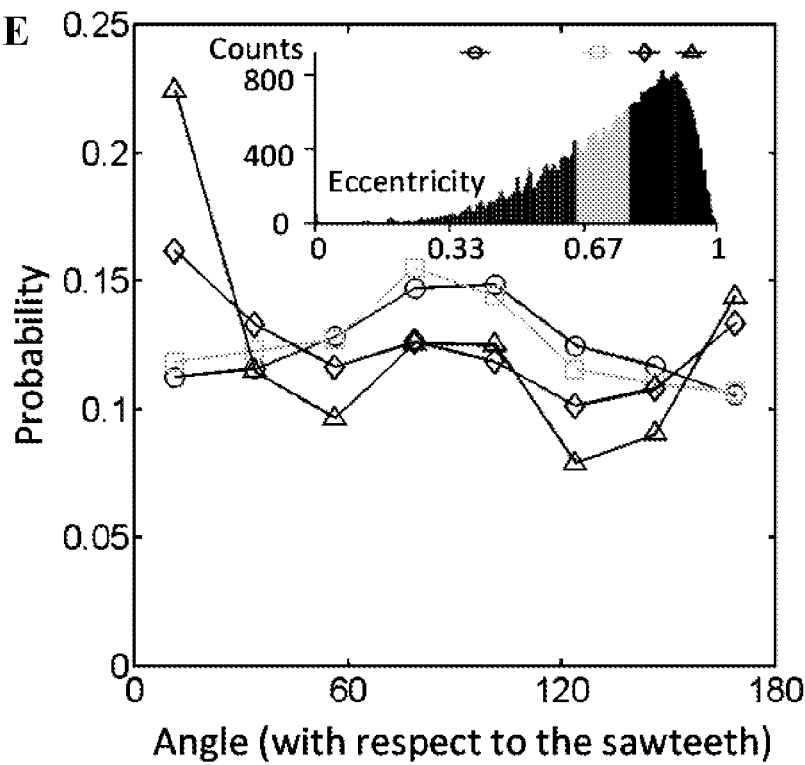
Figure 2I:
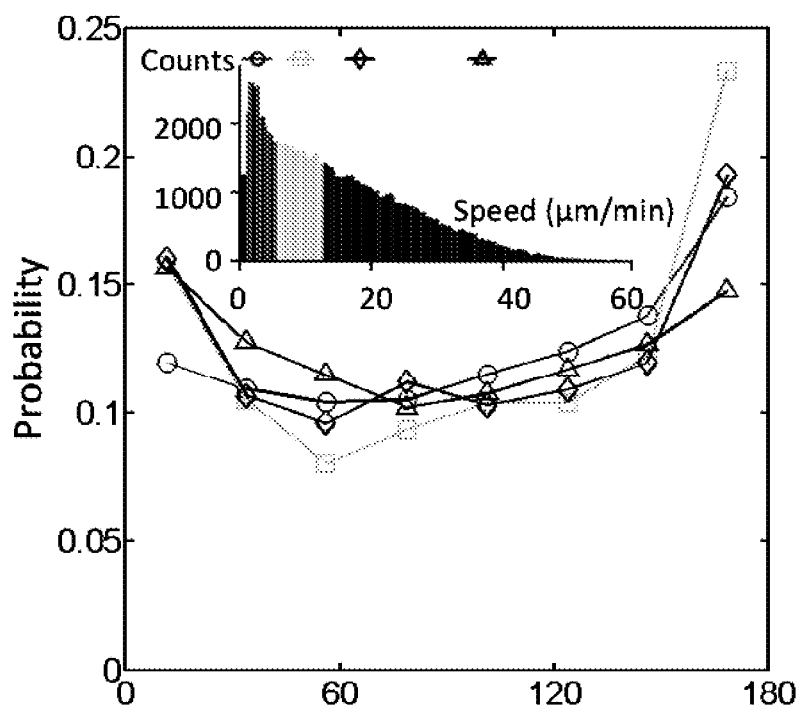

To quantify the unidirectional bias, we analyzed cellular velocity with respect to the orientation of 2-µm-spaced ridges composed of sawteeth either 8 µm long, 2.4 µm high, and 630 nm wide (denoted as 8-µm sawteeth) or 2 µm long, 1 µm high, and 630 nm wide (denoted as 2-µm sawteeth). The polar histogram (FIG. 2A) and the probability distribution (FIG. 2B) of the direction of motion on 8-µm sawteeth demonstrate bias of motion up the sawtooth slope. There is also a slight preference for motion along the 90-270° axis. This minor component of directional bias arises because the sawtooth ridges are in registry, and so the sawtooth minima act as grooves that are perpendicular to the ridges. The slowest cells exhibit the smallest degree of directional preference in their migration (FIG. 2D). Furthermore, the most elongated cells show the greatest alignment with the ridges (FIG. 2E). We also analyzed cell motion on 2-µm-spaced ridges composed of sawteeth that are 6 µm long, 1.8 µm high, and 630 nm wide (the sawteeth shown in FIG. 1) with the same metrics; the results are similar to those of cell motion on 8-µm sawteeth. In contrast, the preferred direction on 2-µm sawteeth is down the sawtooth slope (FIG. 2 F-J). These results illustrate that the direction of microthigmotaxis is dependent on the details of the nano/microtopography.

For further assessment of the relationship between the guidance direction and the frequency at which the cell encounters the sawteeth, it would be desirable to study cell motion on surfaces in which the sawtooth length is 1 µm or smaller. However, because of the constraints of the fabrication method, it is difficult to fabricate asymmetric sawteeth with lengths of 1 µm or less. Instead, sawtooth surfaces with an offset configuration in which the adjacent ridges are out of phase at a constant distance were fabricated. Microthigmotaxis was monitored on such surfaces featuring 800-nm-spaced ridges of sawteeth of length 2 µm, height 400 nm, and width 400 nm (FIGS. 5A and 5B). Sawteeth in adjacent ridges were offset by 1 µm. Because of this offset, a cell encounters one new tooth for every 1 µm of displacement. The spacing between ridges was reduced from 2 µm to 0.8 µm to provide each cell with more guidance cues. The probability distribution of direction of motion (FIG. 5C) indicates that cells tend to migrate parallel to the ridges and down the sawteeth.

How the sawteeth influence intracellular dynamics was also considered. Snapshots of the spatial distribution and dynamics of actin filaments (F-actin) using cells that overexpress proteins associated with actin polymerization (LimEL1coil-GFP and LifeAct-TagRFP) show that F-actin forms streak-like linear structures parallel to the ridges of 8-μm sawteeth. These structures extend 500 nm away from the ridges. Time-lapse imaging reveals that the F-actin streaks are actin polymerization waves in which the leading tip of each streak sweeps to probe the nano/microenvironment. The linear actin structures that adhere to the opposite sides of a sawtooth typically exhibit coupled dynamics (FIG. 3A-3C). To confirm that the dynamic fluorescence arises from the in situ actin polymerization rather than from an optical effect, we imaged cAR1-YFP cells migrating on the nanosawtooth surface as a control. The fluorescence in the plasma membrane remains spatially uniform, with no apparent bursts of intensity enhancement or depletion.

To assess the role of the ridges in unidirectional contact guidance, cell motion was analyzed on a single sawtooth "ridge" with a width of 300 μm (i.e., a pattern akin to closed louvers). Cell motion on a film of 8-μm-long, 2.4-μm-high sawteeth (FIGS. 6A and 6B) exhibits a bidirectional bias along the perpendicular sawtooth grooves, whereas migration along the sawteeth is suppressed (FIG. 6C). Therefore, the existence of nano/microscale ridges is a prerequisite for achieving unidirectional guidance, presumably because the edges of ridges promote the streak-like polymerization of actin adhering to them.

Figure 3F:
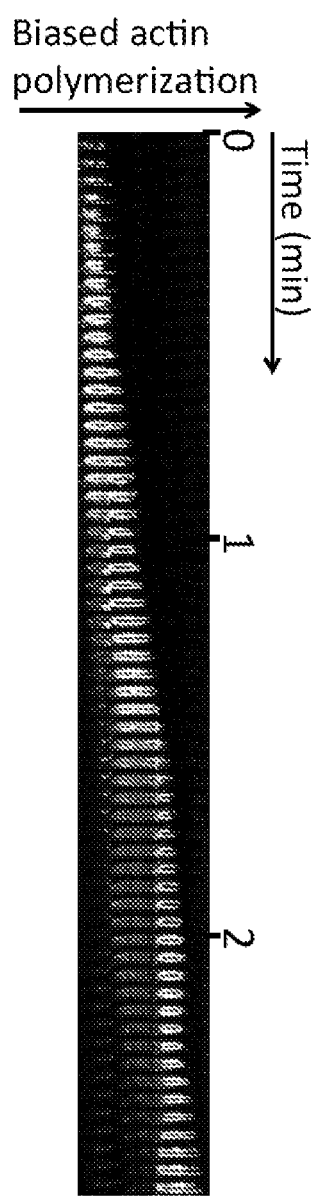
Figure 3L:
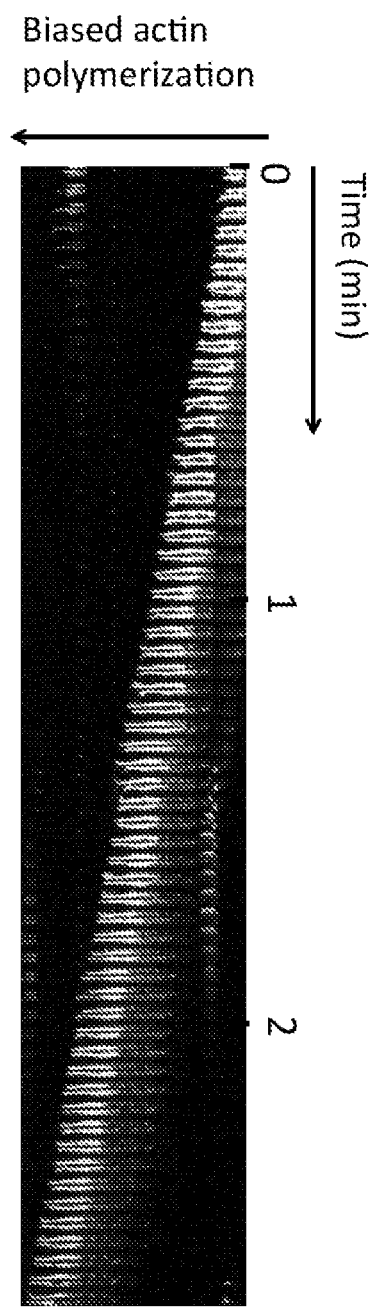

We adapted an optical-flow algorithm to determine the direction and magnitude of the apparent flux of actin polymerization for each pixel. Although this flux has the same preferred direction as cell motion, actin polymerization is more strongly unidirectional than is cell migration (compare FIGS. 2B and 3D). Because the actin polymerization exhibits directed, wave-like dynamics, we term this internal guidance phenomenon "esotaxis" (with "eso" being Greek for "inner"). It was observed that actin polymerization waves push on the leading edge of the portion of the plasma membrane that adheres to the surface, suggesting a causal relationship between the directed actin-wave propagation (esotaxis) and the directed cell motion (microthigmotaxis). Averaging of polymerization activity around each 8-μm sawtooth shows that sawtooth minima serve as sources of actin polymerization waves that propagate up the sawteeth (FIG. 3E). The actin waves have a uniform speed but sometimes stall at the tips of sawteeth (FIG. 3F); 2-μm sawteeth also induce localized waves that are confined along the tops of the sawteeth (FIG. 3 G-L), and yet in this case, the waves migrate preferentially down the sawtooth slope. The speed of actin waves is comparable in both cases, about 30 μm/min. This behavior is consistent with the observed cell motion. As was the case for 8-μm sawteeth, actin polymerization is more strongly biased than is migration for 2-μm sawteeth (compare FIGS. 2G and 3J).

Figure 7A:
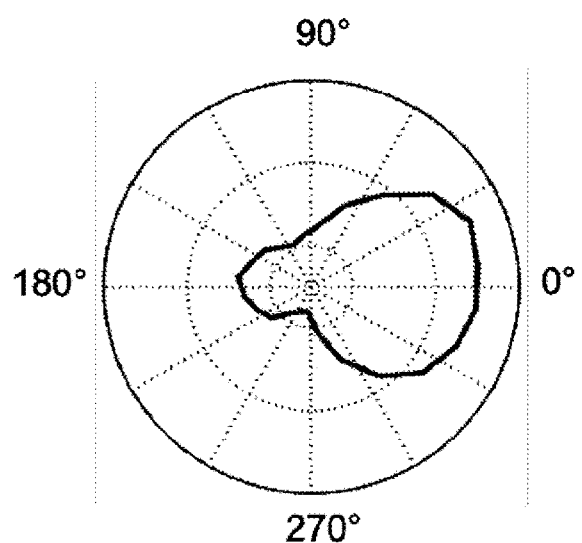
FIG. 7A-FIG. 7B shows actin-wave directionality in developed *D. discoideum* cells that were incubated with 10 μM (FIG. 7A) and 50 μM (FIG. 7B) LY294002 and stimulated with exogenous cAMP with a uniform concentration of 3 μM.
Figure 7B:
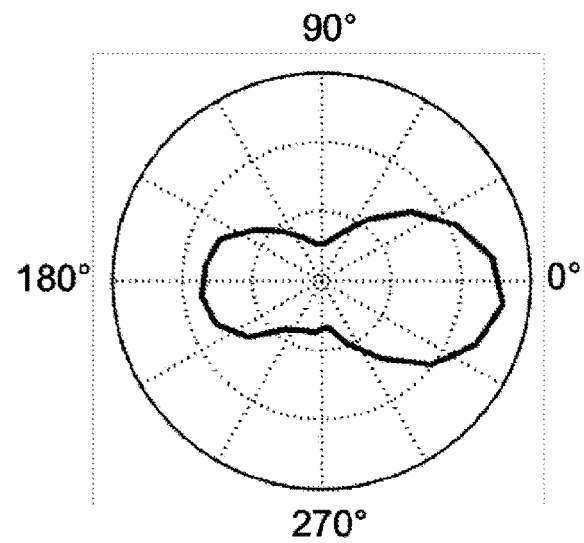
Figure 8:
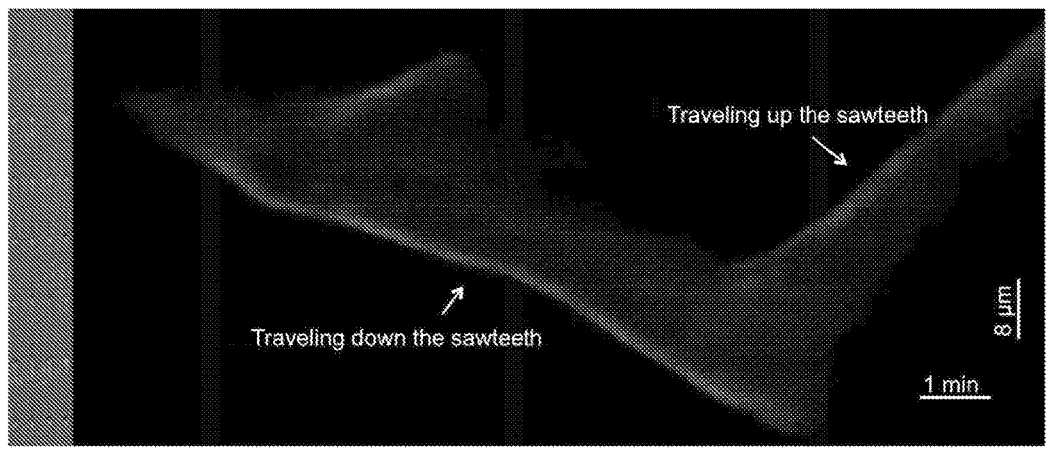
Figure 9:
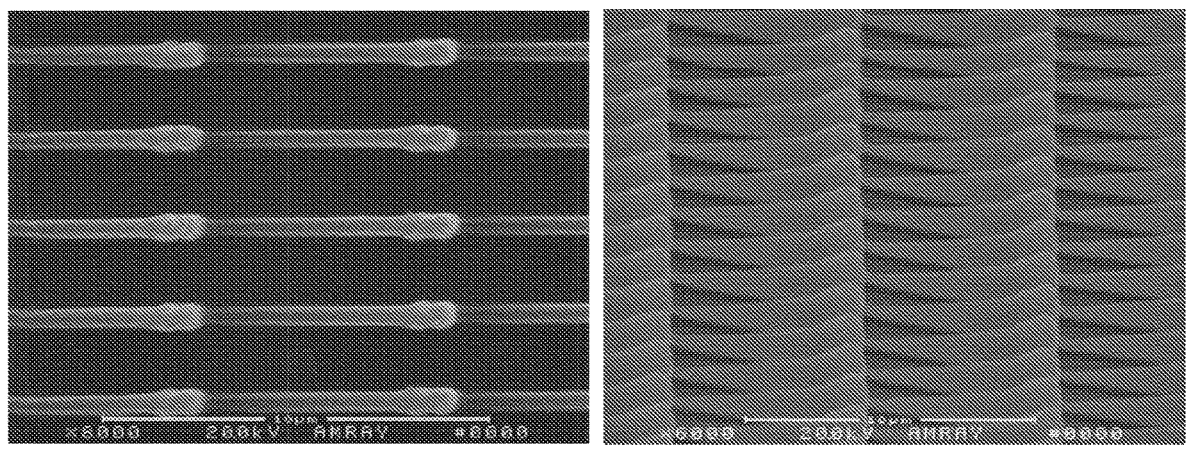
FIG. 9 shows scanning electron micrographs of a nano topographic surface used to effect contact guidance.

The actin waves observed are presumably different from those recently found in connection with phagocytosis/micropinocytosis (Clarke et al., 2010, BMC Biol 8: 154), because phagocytosis/micropinocytosis is suppressed after 5 h of development (Katoh et al., 2007, Eukaryot Cell 6(11): 2038-2045). To assess directly whether phagocytosis/macropinocytosis plays a role in the observed unidirectional actin-wave propagation, we inhibited PI3K, which is requiredin phagocytosis/macropinocytosis, by incubating the developed cells with LY294002. The actin-flux analysis still shows a unidirectional bias up the slope (FIGS. 7A and 7B), indicating that the unidirectional guidance we observe is independent of phagocytosis/macropinocytosis.

Figure 4A:
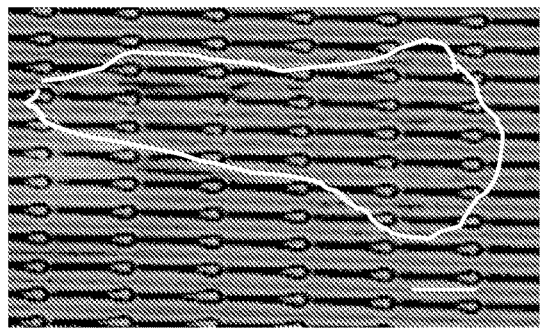
FIG. 4A-FIG. 4G. Cellular morphology and actin waves of YFP-actin HL60 neutrophils on sawteeth. (FIGS. A and B) Bright-field micrograph (FIG. 4A) and confocal micrograph (FIG. 4B) of a polarized neutrophil.
Figure 4B:
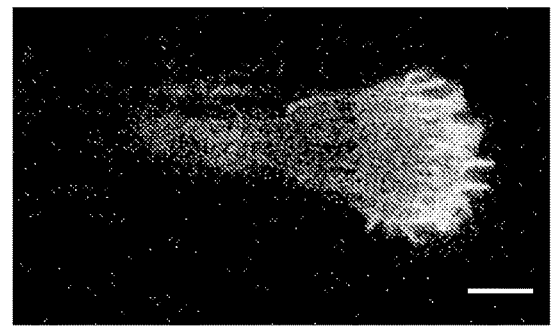
Figure 4C:
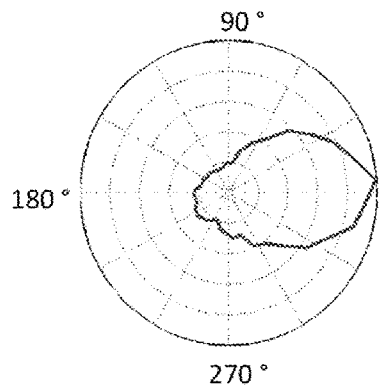
Figure 4F:
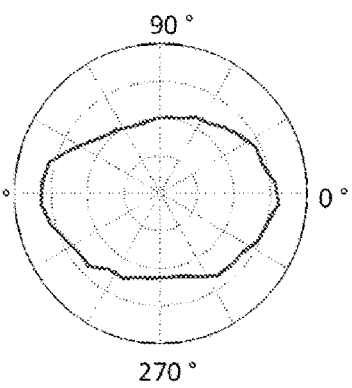
Figure 4D:
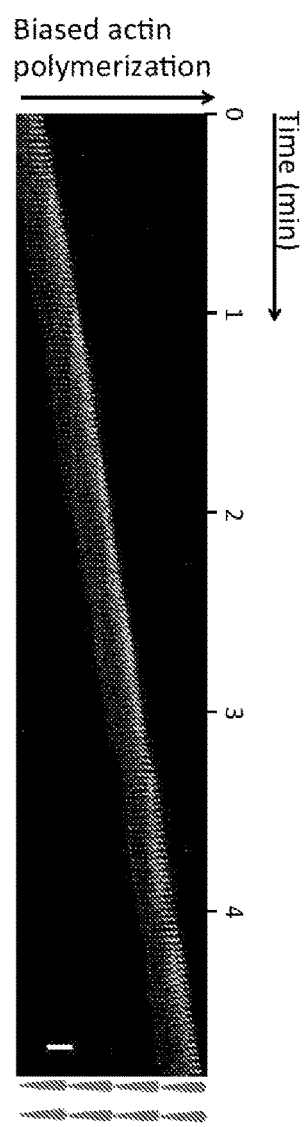
Figure 4E:
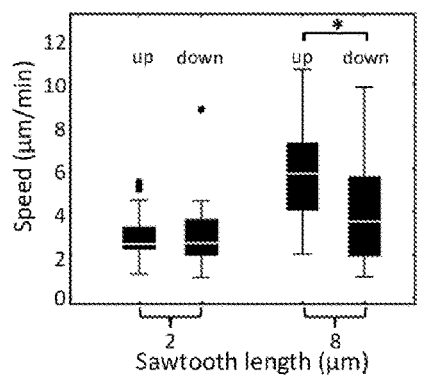
Figure 4G:
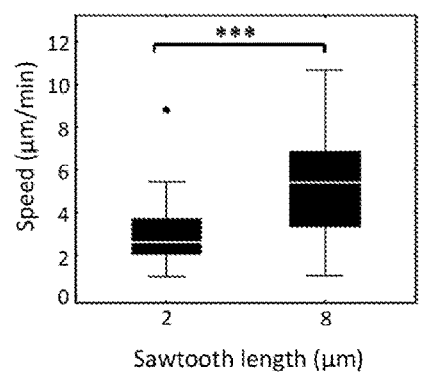

Actin-wave propagation in human neutrophils (YFP-actin HL60) was also studied. Unlike *D. discoideum*, which protrudes pseudopods that can be microns above the surface, neutrophils extend lamellipodia (FIGS. 4A and 4B) that adhere firmly to the surface. The actin-wave dynamics in HL60 cells on sawteeth are similar to those of *D. discoideum*, even though actin waves in HL60 cells are localized in lamellipodia, whereas actin waves in *D. discoideum* occur throughout the area of cell-surface contact. HL60 cells on 8-μm sawteeth exhibit unidirectional bias of actinwaves and migrate up the sawteeth (FIG. 4C). Individual actin waves undergo persistent propagation along multiple sawteeth (FIG. 4D). The average speed of actin waves in HL60 cells is faster when the waves are propagating up the sawteeth than when they are propagating down the sawteeth (FIG. 4E) and is significantly slower than in *D. discoideum*. Actin waves in HL60 cells on 2-μm sawteeth exhibit bidirectional guidance (FIG. 4F). The speed of the actin waves on 2-μm sawteeth is significantly slower than that on 8-μm sawteeth (FIG. 4G).

Conclusions

These results demonstrate unambiguously that unidirectional guidance can be achieved by local nano/microtopographical gradients on scales smaller than that of a single cell, but comparable to typical sizes of collagen fibers. The directed cellular motion (microthigmotaxis) arises from directed, internal actin-wave propagation (esotaxis). Here, nano/microtopography guides intracellular dynamics (waves of actin polymerization), propelling the cell with a preferred direction. However, it should also be noted that suitable microscopic patterns in properties such as surface chemistry or elastic modulus could potentially also induce esotaxis. The dependence of the guidance direction on sawtooth length and height indicates that multiple competing mechanisms may be involved in biasing actin polymerization waves. Some of the factors that affect actin polymerization are presumably sensitive to local geometry. Such factors may include membrane tension, which locally inhibits actin polymerization (Houk et al., 2012, Cell 148(1-2): 175-188), and bending of actin filaments, which leads to preferred localization of the Arp 2/3 complex on the convex side of bent actin filaments (Risca et al., 2012, PNAS 109(8): 2913-2918). The conservation of microthigmotaxis and esotaxis for different cell types with distinct surface interactions during migration and the prevalence of polarity and asymmetry in the local microenvironment of cells suggest that biasing of intracellular waves is important in many physiological processes. For instance, aligned collagen fibers guide cancer cells and are a prognostic signature of breast carcinoma (Conklin, et al., 2011, Am J Pathol 178(3): 1221-1232). These results suggest the possibility that asymmetric nano/microtopography of collagen fibers promotes unidirectional contact guidance in vivo. Asymmetric topographies could be incorporated in tissue engineering and regenerative medicine. For instance, sawtooth surfaces may be used to accelerate the wound-healing process by promoting the unidirectional migration of neutrophils, fibroblasts, and epithelial cells toward the injured site. Controlled anisotropic nano/microtopographies imprinted on surfaces or embedded in 3D structures should be able to guide cells over large distances, with possible applications in the broad range of biomedical problems in which directed cell migration is important.

Materials and Methods
Preparation of Sawtooth Surfaces.

Sets of parallel, 300-µm-long ridges of asymmetric sawteeth were fabricated via multiphoton absorption polymerization (MAP) (LaFratta et al., 2007, Angew Chem Int Ed Engl 46(33): 6238-6258) using a commercial Ti:sapphire laser (Coherent Mira 900-F). Each set covered an area of 300×300 µm. Surfaces composed of continuous nanosawteeth (as opposed to ridges of sawteeth) were fabricated with a 200-nm step size perpendicular to the sawteeth. The acrylic resin used was composed of 49 wt % Tris(2-hydroxyethyl) isocyanurate triacrylate (SR368; Sartomer), 49 wt % ethoxylated (Parent et al., 1999, Science 284(5415): 765-770) trimethylolpropane triacrylate (SR499; Sartomer), and 2 wt % Lucirin TPO-L (Ciba). Master structures were fabricated on acrylate-functionalized glass slides (Stocker et al., 2011, Nat Chem 3(3): 223-227). The typical power of the fabrication beam was 4 mW as measured at the sample. The sample preparation and fabrication procedure have been described previously (Stocker et al., 2011, cited above). The master surfaces were functionalized with primary amines using a mixture of ethylenediamine (E26266; Sigma-Aldrich) and ethanol (1:4, vol/vol) for 30 min, and then were treated with a solution containing 0.03 g of perfluorooctadecanoic acid (L16837; Alfa Aesar), 4.5 g of hexafluorobenzene (H8706; Sigma-Aldrich), 16 mL of ethanol, and 50 µL of methanol for 1.5 h to render the surface highly hydrophobic, facilitating the release of cured polydimethylsiloxane (PDMS). To replicate sawteeth accurately, we modified a previously described method (Kang et al., 2006, Nanotechnology 17: 197-200) to prepare a composite PDMS mold consisting of a thin layer of hard PDMS with relief features that was backed by a thick slab of soft PDMS. To prepare the hard PDMS, 1.7 g of vinyl PDMS prepolymer (VDT-731; Gelest), 9 µL of Pt catalyst (SIP6831.2; Gelest), 0.05 g of modulator (87927; Sigma- Aldrich), 0.5 g of hydrosilane (HMS-301; Gelest), and 1 g of hexane were mixed. The mixture was spin-coated on the master surface (1,000 rpm, 40 s), allowed to sit at room temperature for 2 h, and then baked at 60° C. for 1 h. Soft PDMS was prepared by mixing the base and curing agent (Sylgard 184; Dow Corning) in a 10:1 mass ratio. After degassing, the uncured soft PDMS was poured onto the precured hard PDMS and baked at 60° C. for 1 h. After curing, the composite PDMS was peeled off of the master surface. Replicas of sawteeth were created by sandwiching a drop of acrylic resin between the mold and an acrylate-functionalized coverslip and then UV curing (Blak-Ray, B-100AP, 100 W, 365 nm; samples were cured 254 mm from the source). Surfaces for *D. discoideum* were UV-cured for 5 min and then treated with high-pressure oxygen plasma for 3 min. Surfaces for neutrophils were UV cured for 40 s, baked at 90° C. for 10 min, and then coated with 1 µg/mL fibronectin in HESS [Fl 141 (Sigma-Aldrich); fluorescent fibronectin: FNR02-A (Cytoskeleton)] at 37° C. for 1 h. The coated surface exhibited uniform fibronectin density.

To prepare the fluorescent sawteeth for confocal z-stack imaging, 2 wt % Rhodamine B was added into the acrylic resin. After thorough mixing, the resin was filtered through a 200-nm-pore-size syringe filter. The replica was prepared in the same way as described above.

Cell Preparation and Imaging

*D. discoideum* cells, cAR1-YFP, aca-, LimEL1coil-GFP, and Lifeact-TagRFP/aca- (all are in an AX3 background) were prepared as described previously (McCanne et al., 2010, cited above). cAR1-YFP and LimELlcoil-GFP cells were developed for 4 h. aca- and Lifeact-TagRFP/aca- cells were developed for 5 h.

cAR1-YFP cells were incubated with 2 mM caffeine for 20 min to block the intracellular activation of cAMP synthesis (Brenner et al., 1984, Dev Biol 101(1): 136-146). After being plated onto a sawtooth surface, cells were stimulated with exogenous cAMP with a uniform concentration of 5 µM. Fluorescence images were obtained on a Leica SP5 X confocal microscope every 2 s with a 100× objective and a scanner zoom factor of 2.

For cell motion imaging, aca- cells were cytoplasmically dyed with 25 µM CellTracker Green CDMFA (5-chloromethylfluorescein diacetate) (Invitrogen) for 30 min and then washed twice with phosphate buffer. After being plated onto a sawtooth surface, cells were stimulated with exogenous cAMP with a uniform concentration of 100 nM. Fluorescence images of aca- cells were obtained on a Leica TCS SP2 confocal microscope every 4 s for 80 min with a l0x objective and a scanner zoom factor of 2. Images were obtained in a 512×512 pixel format.

For actin-wave imaging, LimEL1coil-GFP cells were incubated with 2 mM caffeine for 20 min after development. LimELlcoil-GFP and Lifeact-TagRFP/aca- cells were stimulated with exogenous cAMP with a uniform concentration of 5 and 100 nM, respectively. Both fluorescence and bright-field images were obtained simultaneously on a Leica SP5 X confocal microscope every 2.6 s with a l00x objective and a scanner zoom factor of 2. Images were obtained in a 1,024×1,024 pixel format to provide more information for actin-flux analysis.

To inhibit PI3K in Lifeact-TagRFP/aca- *D. discoideum* cells that have been developed for 5 h, we incubated the cells with both 10 µM and 50 µM LY294002, and stimulated the cells with exogenous cAMP with a uniform concentration of 3 µM. Both fluorescence and bright-field images were obtained simultaneously on a Leica SP5 X confocal microscope every 2.6 s with a 100× objective. Images were obtained in a 1,024×1,024 pixel format.

The neutrophil-like human leukemia cell line HL60 overexpressing YFP-actin was a kind gift of Orion Weiner (University of California, San Francisco, CA). Cells were maintained in RPMI 1640 (medium developed at Roswell Park Memorial Institute) with Glutamax (Invitrogen), 10% (vol/vol) FBS, and penicillin/streptomycin. Cells were passaged every 3-4 d to maintain a density between 105 cells/mL and 106 cells/mL. Cells were differentiated at a density of 4.5 x 105 cells/mL for 6 d in culture medium containing 1.3% (vol/vol) dimethyl sulfoxide. Before imaging, cells were plated on a sawtooth surface coated with 1 µg/mL fibronectin and stimulated with 1 µM f-Met-Leu-Phe (fMLP) in mHBSS (Hank's Balanced Salt Solution) for 10 min. Fluorescence and bright-field time-lapse images were obtained on a Leica SP5 X confocal microscope every 2 s with a 100× objective.

Tracking Cells

Migrating *D. discoideum* cells were tracked as previously described (McCann et all, 2010, cited above; and Kriebel et al., 2003, Cell 112(4): 549-560). Because of image noise, even stationary cells appear to have a direction of motion. We therefore measured the distribution of direction of motion in two different ways: a simple histogram of direction of motion (e.g., FIGS. 2A and 2E) and a probability distribution of direction of motion weighted by speed (e.g., FIGS. 2B and 2F). The weighted plots show the net speed of cells moving in each direction. In all plots, each included speed corresponds to that of a cell in a specific frame rather than the mean speed of a single cell averaged across time.

Figure 2J:
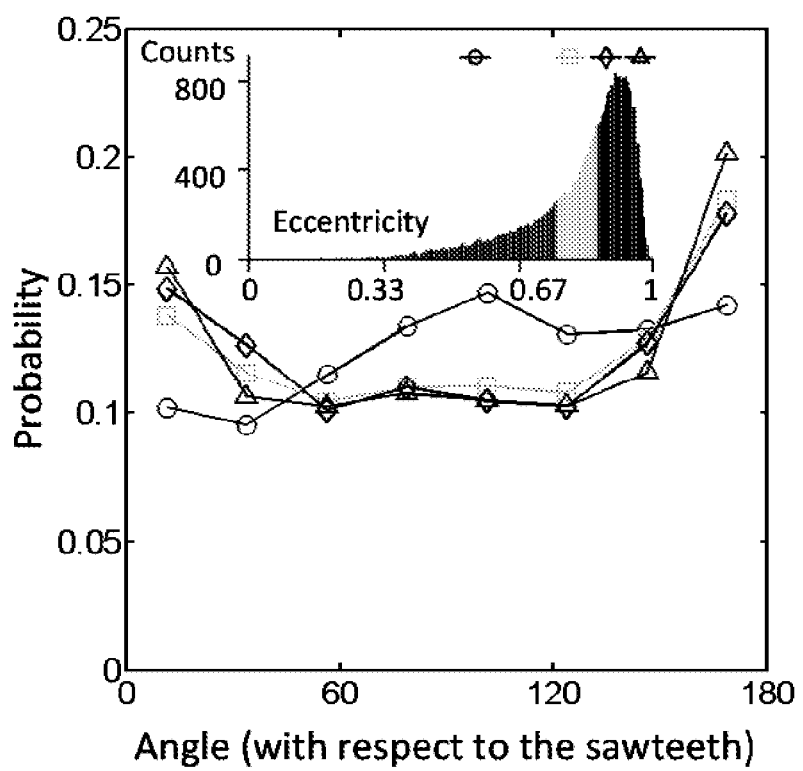

We also plotted the velocity direction distributions (unweighted) for each speed quartile (e.g., FIGS. 2D and 2I) and the orientation distributions for each eccentricity quartile (e.g., FIGS. 2E and 2J). Angles were defined relative to the sawtooth orientation; a cell migrating 5° to the right of the direction up the sawteeth and a cell migrating 5° to the left of the direction up the sawteeth would both be described as migrating at 5° relative to the sawtooth orientation. The alignment and eccentricity of cells were calculated as described previously (Driscoll et al., 2014, ACS Nano 8(4): 3546-3555). We calculated the cell orientation, which ranges from 0° to 360°, from the cell alignment, which ranges from 0° to 180°, using the direction of cellular motion. From the two possible orientations that correspond to each alignment, the orientation was chosen that was closest to the direction of the cell. Additionally, all quartile plots were scaled so that the sum of all angular bins was unity.

Tracking Actin Polymerization

In *D. discoideum* and neutrophils, actin polymerization occurs in reaction-diffusion-type waves. To measure the directionality of these polymerization waves, we used a modified optical-flow algorithm. Optical-flow algorithms assign a pixel-dependent apparent velocity in an image sequence. At each pixel, our algorithm assigns a direction of actin-wave polymerization and a quantity of newly polymerized actin. Although the algorithm does not track stationary actin foci, stationary regions of actin polymerization are included in the unit-cell analysis described below.

To adjust for differences in protein expression levels from cell to cell, all *D. discoideum* and neutrophil images were γ-corrected using a γ of 0.5 before calculating the difference images. A γ correction of 0.5 deemphasizes differences between high intensities, while maintaining differences between low intensities. Cells express different levels of LimELlcoil-GFP and so have different average intensities. Applying a γ correction before further analysis thus allows us to "count" cells of differing brightness more equally without destroying the contrast between the background and dim cells. To track actin polymerization across a pair of subsequent frames, ft and ft+1, we first found the difference image ft+1−ft. Then, to reduce noise, the difference image was smoothed with a Gaussian filter of SD 3 pixels for *D. discoideum* and 1 pixel for neutrophils. Intensity values in our images ranged from 0 to 255. For further noise reduction, a lower threshold of 43 was applied for *D. discoideum* and 24 for neutrophils. Different parameters were used for the analysis of *D. discoideum* and neutrophils, because these cell types migrate at different speeds and were imaged at different resolutions. The intensity of each pixel in this difference image was assumed to be proportional to the amount of newly polymerized actin. To associate a direction with the newly polymerized actin at each pixel, an actin polymerization wave was assumed to be most likely to come from the direction of greatest newly polymerized actin in the previous difference image. Similarly, it is expected that the newly polymerized actin is most likely to travel toward the direction of greatest newly polymerized actin in the future difference image. Therefore, the previous difference image, ft−ft−1, and the future difference image, ft+2−ft+1, were then found. Both difference images were then smoothed with Gaussian filters of SD 5 pixels for *D. discoideum* and 3 pixels for neutrophils. This smoothing step spreads information about the previous and future newly polymerized actin to the location of the newly polymerized actin in the current difference image. The SD of the filter in this smoothing determines the speed of the fastest actin wave that can be tracked by the algorithm. In addition to reducing noise, the first smoothing and the lower threshold described above determine the speed of the slowest actin wave that can be tracked by the algorithm. Finally, we associated a direction with the newly polymerized actin by subtracting the normalized gradient of the previous difference image from the normalized gradient of the future difference image.

Averaged Actin-Flux Analysis

We measured the mean actin fluorescence and actin flux around a sawtooth by averaging across the sawteeth in a movie. To locate the sawteeth, cells were imaged simultaneously in fluorescence and bright-field modes. The sawtooth orientation, ridge spacing, and sawtooth length were measured in each bright-field image. First, a Radon transform (Deans, 2007, *The Radon Transform and Some of Its Applications*, Dover Pubications, Mineola, NY) with an angular step size of 0.1 degrees was used to find the sawtooth orientation. Each bright-field image was then rotated such that the sawteeth were aligned horizontally. The image edges were discarded, because they exhibit interpolation artifacts due to the rotation. Next, each image was projected onto the vertical and horizontal axes. To measure the ridge spacing and sawtooth length to subpixel accuracy, each projection was interpolated using a cubic spline with a spacing of 0.1 pixels. The spacing and pitch were then measured from the autocorrelations of the splines. The spacing was measured from the vertical projection, which is in the direction perpendicular to the ridges, and the pitch was measured from the horizontal projection, which is in the direction parallel to the ridges.

The actin fluorescence intensity and actin flux were next averaged across all of the sawteeth. Each fluorescence image was rotated so that the sawteeth were horizontal. The actin-flux measure was similarly rotated, as was the angle of the vectors within the field. Next, the images were enlarged using a bilinear interpolation, such that the ridge spacing and sawtooth length would be of the next greatest integer size. For instance, if the ridge spacing were 26.8 pixels, then the corresponding dimension of the image would be enlarged by the factor 27/26.8. Forcing the ridge spacing and sawtooth length to have integer dimensions allows for simple averaging across multiple sawteeth. Within each image, the averages of the measures around each sawtooth were next found by tiling the image into subimages of sawtooth size and averaging across the subimages. The mean measures were averaged across images by using the positions of the sawteeth tips in the bright-field images as a guide. To align the sawteeth to subpixel scale, all of the averaged measures were first enlarged by a factor of eight. The bright-field averaged image was then blurred using a Gaussian filter with a SD of 16 pixels. Next, the sawtooth tip was found in the direction parallel to the ridges by finding the row with the greatest SD in bright-field intensity. The position of the tip parallel to the ridges was then found as the position with the greatest bright field intensity along the ridge. After centering, the mean measures were shrunk by a factor of eight and then averaged across all frames.

Measuring Actin-Wave Speed

The actin-wave propagation speed in neutrophils (FIG. 4E and FIG. 4G) was measured using space/time plots (FIG. 15). An actin wave traveling along a single ridge was cropped and resized into a single-pixel width using the ImageJ software (National Institutes of Health) (Collins et al., 2007, Biotechnique 43(1 Suppl): 25-30). The same processing was repeated on every cropped image in the time-lapse series. The resized actin waves were montaged into a space/time plot. Actin-wave propagation speed was obtained by dividing the distance that the wave front traveled by the time lapse. More than 60 individual speeds were measured on each type of sawtooth surface.

Example 2

Migration of MCF10A Healthy Breast Tissue Cells

Figure 12A:
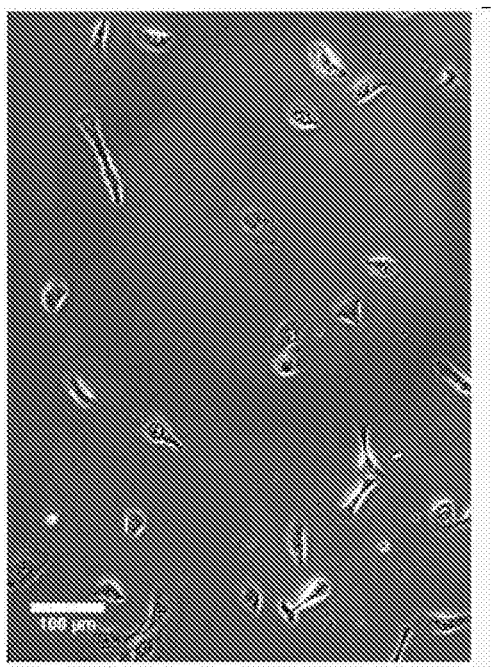
FIG. 12A-FIG. 12H shows analysis of cell tracks on a flat surface and on 1.5 tm spaced nanoridges by measuring contact guidance of MCF10A cells. These cells are derived from breast tissue of a healthy patient. Phase-contrast images of the cells with a scale bar of 100 μm (FIG. 12A and FIG. 12B). Individual cell tracks (show in different grayscale colors for each cell) from a representative movie are shown over 10 h with scale bar 100 μm (FIG. 12C and FIG. 12D). The normalized velocity direction distribution is shown for all cells in all frames over all movies with a black curve for the flat surface and a gray curve for the nanoridge surface (FIG. 12E). The mean first-passage time for cells to reach a displacement r is shown in (FIG. 12F) with the same colors as (FIG. 12E); error bars indicate standard error of the mean across cells.
Figure 12B:
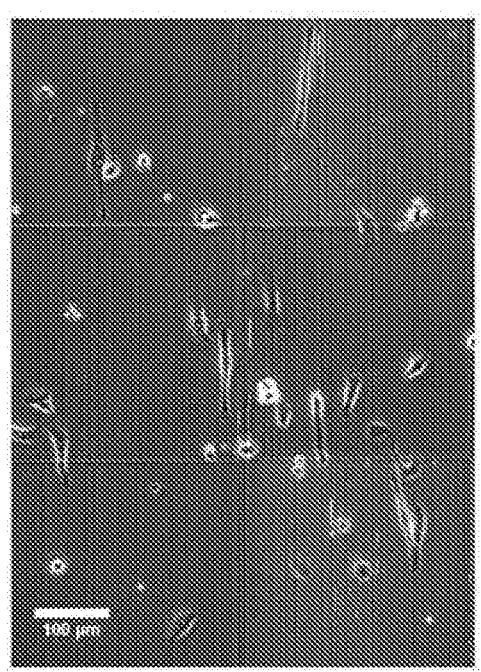
Figure 12C:
Figure 12D:
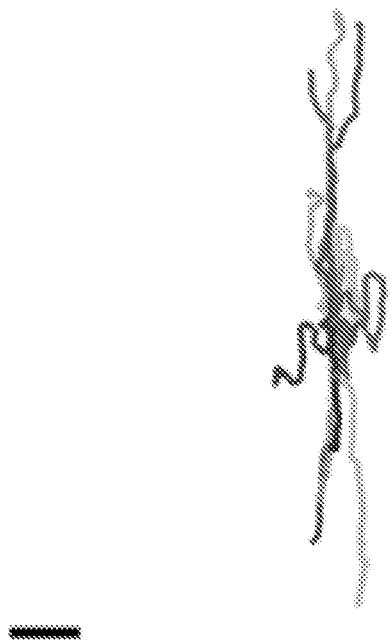
Figure 12E:
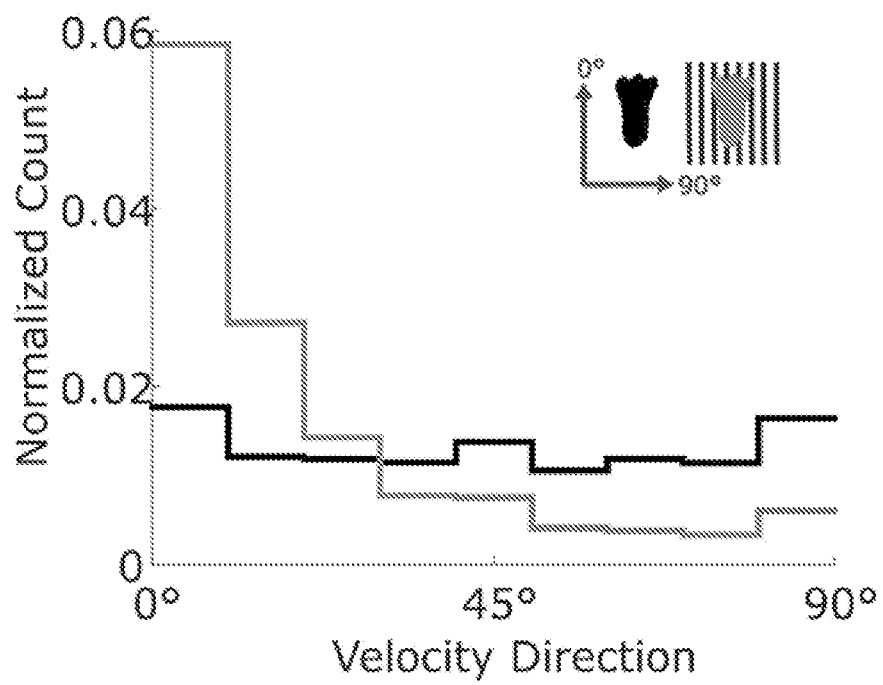
Figure 12F:
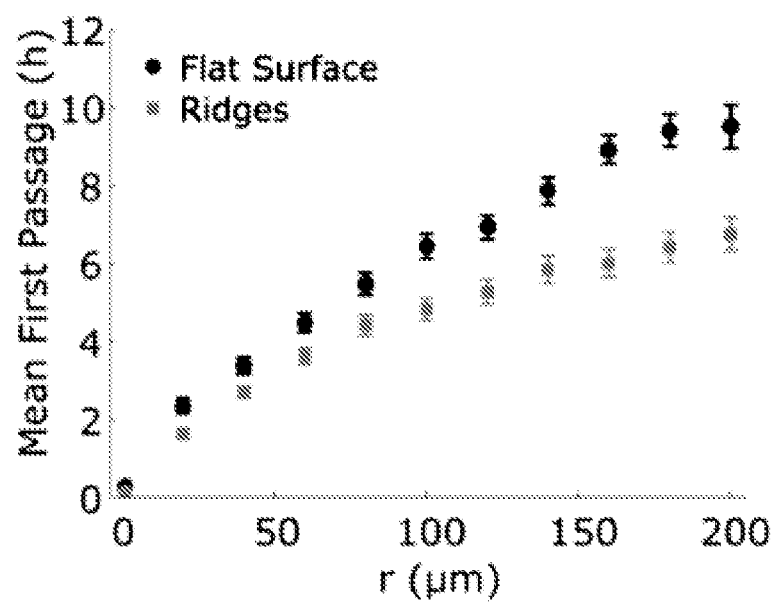
Figure 12G:
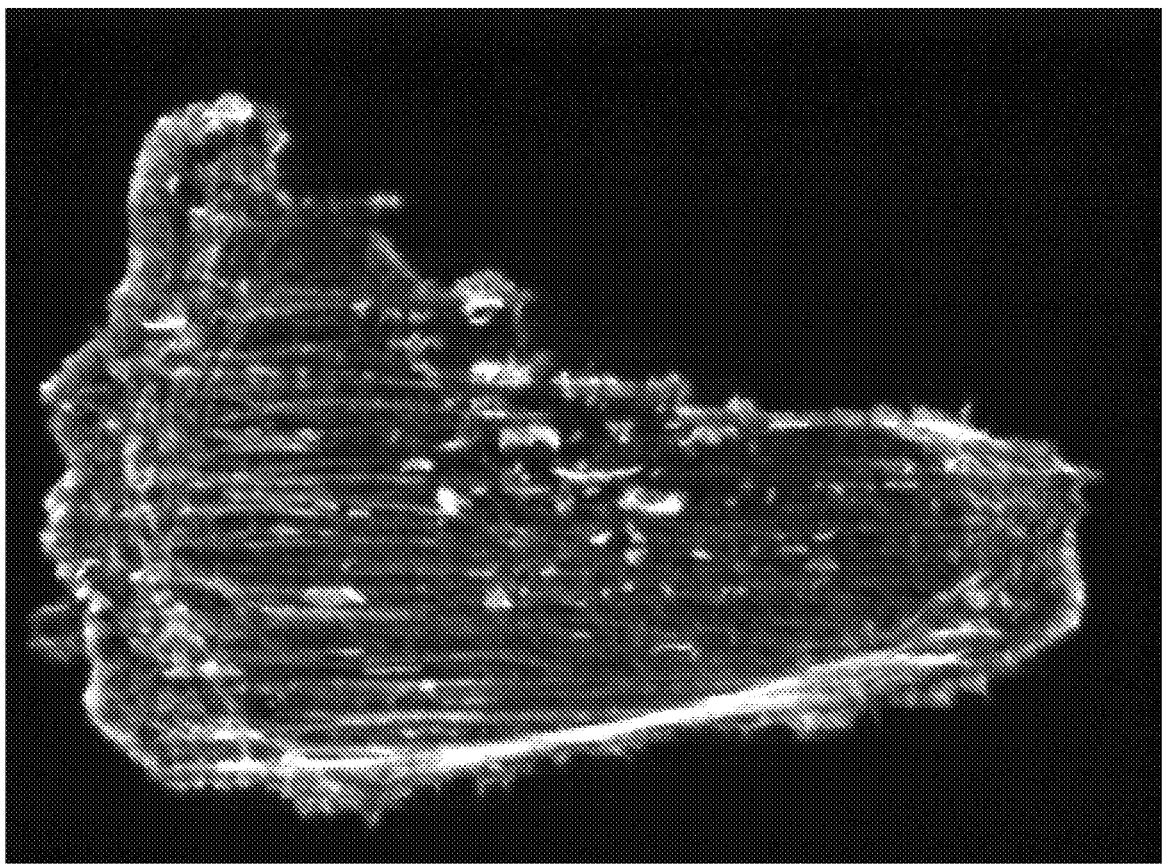
Figure 12H:
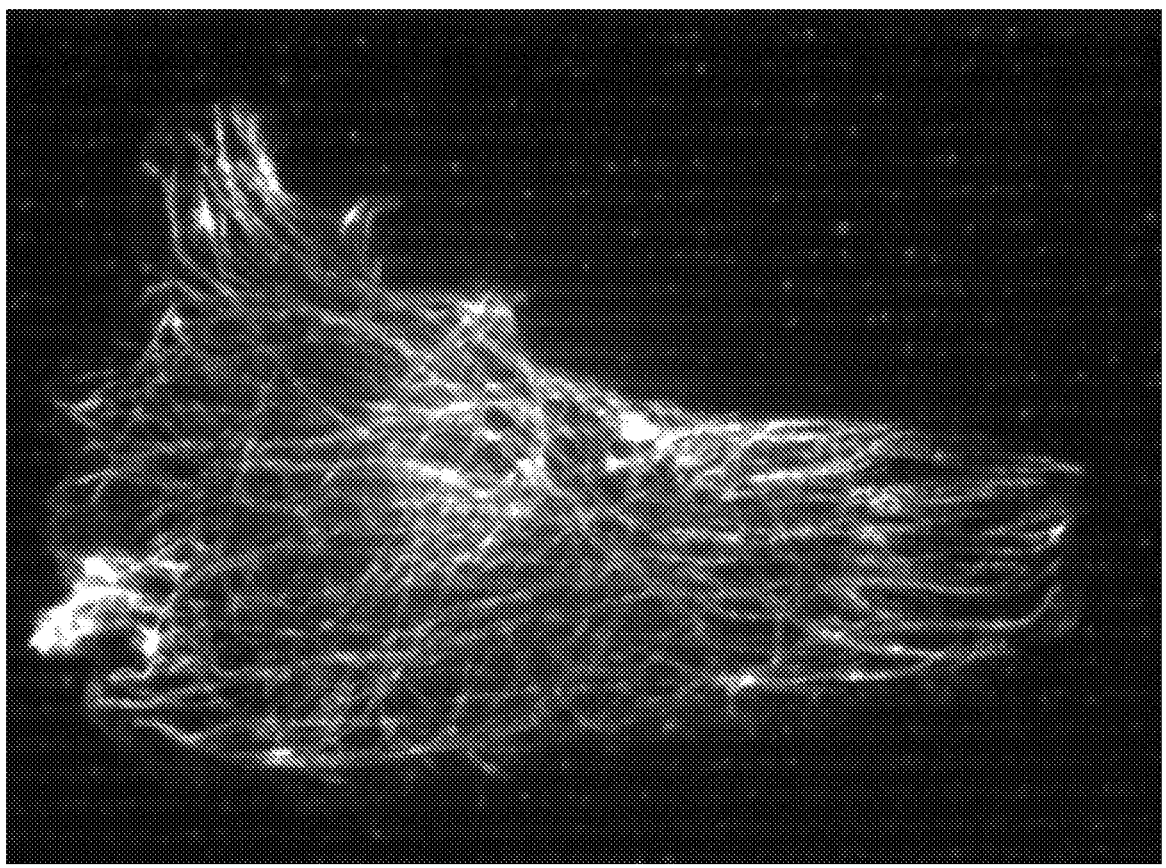

FIG. 12A-12H shows analysis of cell tracks on a flat surface and on 1.5 µm spaced nanoridges by measuring contact guidance of MCF10A cells. MCF10A cells are derived from breast tissue of a healthy patient. Phase-contrast images of the cells with a scale bar of 100 µmare shown in FIGS. 12A and 12B. Individual cell tracks (show in different grayscale colors for each cell) from a representative movie are shown over 10 h with scale bar 100 µmin FIG. 12C and FIG. 12D. The normalized velocity direction distribution is shown for all cells in all frames over all movies with a black curve for the flat surface and a gray curve for the nanoridge surface (FIG. 12E). The mean first-passage time for cells to reach a displacement r is shown in (FIG. 12F) with the same colors as (FIG. 12E); error bars indicate standard error of the mean across cells. In FIGS. 12E and 12F, there are n=150 cells on the flat surface and n=141 cells on the ridged surface from N=2 days of experiments. (FIG. 12G) Actin stain and (FIG. 12H) tubulin stain of fixed M1 cells on 2-µm-spaced ridges. The ridges are horizontally oriented.

Example 3

PROPHETIC. Preparation of Medical Adhesive Bandages Containing an Absorbent Pad with a Sawtooth Surface Medical adhesive bandages comprising a backing, an absorbent pad, and a pressure sensitive adhesive to maintain the medical adhesive bandage in place will be prepared. Preparation of medical adhesive bandages is described, for example, in US2007/001077, which is incorporated by reference herein in its entirety. The backing will contain two major surfaces, i.e., an outer major surface and an inner major surface, a reinforcing scrim, and a layer of pressure-sensitive adhesive disposed on the inner major surface thereof. Backing materials that will be evaluated include polyethylene, other polyolefins, and polyurethane polymers and blends of such materials. Absorbent pads manufactured from a number of materials will be evaluated, including woven and nonwoven cotton, rayon, nonwovens, hydrocolloids, foams, and combinations thereof. Sawtooth surfaces will be applied to the absorbent pad using the methods described above in Example 1.

The invention claimed is:

1. A method of guiding unidirectional movement of a first cell in a sample comprising different cell types, the method comprising:
    exposing the sample to a surface comprising a three-dimensional pattern of one or a plurality of asymmetric topographical elements for a time period sufficient to bias actin polymerization within the first cell;
    biasing movement of the first cell in a first direction along the asymmetric topographical elements; and
    biasing movement of a second cell in a second direction along the asymmetric topographical elements, wherein the first and the second cells are different cell types and the first and second directions are different;
    wherein the topographical elements are from about 0.001 to about 100 microns in height or width or depth and aligned along at least one or a plurality of straight, curved or circumferential paths on the surface.

2. The method of claim 1, wherein the topographical elements are protrusions aligned in a set of evenly spaced rows across at least a portion of the surface.

3. The method of claim 1, wherein the three-dimensional pattern of asymmetric topographical elements comprise at least one or a plurality of saw-toothed, columnar, ridge or pyramidal shaped elements.

4. The method of claim 1, wherein the topographical elements are saw-tooth protrusions aligned in a set of evenly spaced rows across at least a portion of the surface.

5. The method of claim 4, wherein the saw-tooth protrusions are from about 0.4 to about 2.5 microns in height, from about 0.8 to about 8.0 microns in length, from about 0.1 to about 0.8 microns in width and from about 0.8 and to about 2.2 microns in spacing between consecutive protrusions along the path or between rows.

6. The method of claim 3, wherein the asymmetric topographical elements are saw tooth protrusions that are from about 0.1 to about 3.0 microns in height.

7. The method of claim 3, wherein the asymmetric topographical elements are saw tooth protrusions that are from about 0.05 to about 1.00 micron in width.

8. The method of claim 3, wherein the asymmetric topographical elements are saw tooth protrusions that are from about 0.3 to about 20.0 microns in length.

9. The method of claim 3, wherein the asymmetric topographical elements are saw tooth protrusions that have a repeat distance from about 0.3 to about 25.0 microns.

10. The method of claim 3, wherein the asymmetric topographical elements are saw tooth protrusions that have a pitch of from about 0.2 to about 6.0 microns.

11. The method of claim 3, wherein the asymmetric topographical elements are saw tooth protrusions that have an offset distance from about 0 to about 12.5 microns.

12. The method of claim 1, wherein the method comprises movement of the cell across a distance of at least about 5 microns.

13. A method of inducing directional movement of a cell in a sample comprising different cell types, the method comprising:
    contacting the sample to a surface comprising a three-dimensional pattern of one or a plurality of asymmetric topographical elements for a time period sufficient to bias actin polymerization within the cell;
    selectively guiding movement of only cells of a first cell type in a first direction along the asymmetric topographical elements;
    wherein the topographical elements are from about 0.001 to about 100 microns in height or width or depth and aligned along at least one or a plurality of straight, curved or circumferential paths on the surface.

14. The method of claim 13 wherein the movement is across a distance of at least about 5 microns.

15. A method of inducing healing of a wound of a subject, comprising:
    contacting the wound with a contact side of a composition, at least a portion of the contact side having a cell contact portion with a three-dimensional pattern of one or a plurality of asymmetric topographical elements, the topographical elements being from about 0.001 to about 100 microns in height or width or depth and aligned along at least one or a plurality of straight, curved or circumferential paths on the cell contact portion;

biasing movement of a first cell type in a first direction along the asymmetric topographical elements; and biasing movement of a second cell type in a second direction different than the first direction along the topographical elements;

wherein biasing movement of the first cell type in the first direction along the asymmetric topographical elements includes:

contacting the wound with the composition for a time period sufficient to bias actin polymerization within a plurality of cells of the first cell type at, adjacent to, or proximate to the wound such that the cells unidirectionally move toward or away from a direction defined by the sidedness of the asymmetric uppermost points of the topographical elements.

16. The method of claim 15 wherein the composition comprises a surface configured for contacting a wound wherein the surface comprises a three-dimensional pattern comprising one or a plurality of offset, parallel paths of asymmetric saw tooth-shaped protrusions, wherein the protrusions have a repeat distance from about 0.3 to about 25.0 microns, a pitch of from about 0.2 to about 6.0 microns, and an offset distance from about 0 to about 12.5 microns.

17. The method of claim 1, wherein the first cell type is one of a neutrophil, fibroblast, or epithelial cell.

18. The method of claim 13, wherein the first cell type is one of a neutrophil, fibroblast, or epithelial cell.

19. A method of guiding movement of a cell, comprising:

providing a surface with a three-dimensional pattern of one or a plurality of asymmetric topographical elements, the asymmetric topographical elements having a first side with a first side length and a second side with a second side length shorter than the first side length;

contacting the cell with the surface including the asymmetric topographical elements;

biasing movement of a first cell type along the first side of the asymmetric topographical elements; and biasing movement of a second cell type along the second side of the asymmetric topographical elements;

wherein the topographical elements are from about 0.001 to about 100 microns in height or width or depth and aligned along at least one or a plurality of straight, curved, or circumferential paths on the surface.

* * * * *